US011849176B2

(12) United States Patent
Hines

(10) Patent No.: US 11,849,176 B2
(45) Date of Patent: Dec. 19, 2023

(54) SYSTEMS AND METHODS FOR FACILITATING VOICE INTERACTION WITH CONTENT RECEIVERS

(71) Applicant: DISH Network L.L.C., Englewood, CO (US)

(72) Inventor: Brandon Hines, Owasso, OK (US)

(73) Assignee: DISH Network L.L.C., Englewood, CO (US)

( * ) Notice: Subject to any disclaimer, the term of this patent is extended or adjusted under 35 U.S.C. 154(b) by 0 days.

(21) Appl. No.: 17/952,843

(22) Filed: Sep. 26, 2022

(65) Prior Publication Data

US 2023/0020257 A1    Jan. 19, 2023

Related U.S. Application Data

(63) Continuation of application No. 17/086,024, filed on Oct. 30, 2020, now Pat. No. 11,477,523.

(51) Int. Cl.
| | | |
|---|---|---|
| *H04N 21/4415* | (2011.01) | |
| *H04N 21/4627* | (2011.01) | |
| *H04N 21/422* | (2011.01) | |
| *G10L 17/06* | (2013.01) | |

(52) U.S. Cl.
CPC ......... *H04N 21/4415* (2013.01); *G10L 17/06* (2013.01); *H04N 21/42203* (2013.01); *H04N 21/4627* (2013.01)

(58) Field of Classification Search
CPC ......... H04N 21/8547; H04N 21/42203; H04N 21/4394; H04N 21/4415
See application file for complete search history.

(56) References Cited

U.S. PATENT DOCUMENTS

| | | |
|---|---|---|
| 2018/0349093 A1 | 12/2018 | McCarty et al. |
| 2019/0020493 A1 | 1/2019 | Arling et al. |
| 2020/0194004 A1 | 6/2020 | Bates |
| 2021/0304259 A1* | 9/2021 | Harrison .......... H04N 21/42203 |

* cited by examiner

*Primary Examiner* — Samira Monshi
(74) *Attorney, Agent, or Firm* — KILPATRICK TOWNSEND & STOCKTON LLP

(57) ABSTRACT

Content receiver systems, methods, and machine-readable media to facilitate adaptive voice interaction are disclosed. An audio cue may be detected and mapped to a first viewer in proximity of an audio sensor. Sensor-based data that is based on the audio sensor capturing audio phenomena in the proximity may be received. A set of rules specified by an operations protocol may be accessed. The set of rules may include criteria for mapping a recognition of voice data to operations of a content receiver. The sensor-based data may correspond to a recognition of first voice data of the first viewer. A rule of the set of rules may be used to map the sensor-based data to an operation of the content receiver. Responsive to the audio cue, the content receiver may be caused to perform the operation.

19 Claims, 5 Drawing Sheets

SYSTEMS AND METHODS FOR FACILITATING VOICE INTERACTION WITH CONTENT RECEIVERS

CROSS-REFERENCE TO RELATED APPLICATION

This application is a continuation of U.S. patent application Ser. No. 17/086,024 filed Oct. 30, 2020, entitled "SYSTEMS AND METHODS FOR FACILITATING VOICE INTERACTION WITH CONTENT RECEIVERS," the entire disclosure of which is hereby incorporated by reference, for all purposes, as if fully set forth herein.

FIELD

This disclosure generally relates to content delivery, and more particularly to systems and methods for facilitating voice interaction with content receivers.

BACKGROUND

As value, use, access, and demand corresponding to video content distribution continue to increase, content viewers have come to expect that their content receivers offer a number of robust and useful features. However, with the proliferation of different features, a viewer can encounter a number of difficulties. Chief among the difficulties is the amount of time and effort necessary to fully utilize the features. There are needs for deeper integration with content devices that allow for better viewer experiences and more tailored service offerings.

Thus, there is a need for systems and methods that address such problems. This and other needs are addressed by the present disclosure.

BRIEF SUMMARY

Certain embodiments of the present disclosure relate generally to content delivery, and more particularly to systems and methods for facilitating voice interaction with content receivers.

In one aspect, a content receiver system to facilitate adaptive voice interaction is disclosed. The content receiver system may include one or more processing devices and one or more non-transitory, computer-readable storage media storing instructions which, when executed by the one or more processing devices, cause the one or more processing devices to perform one or a combination of the following operations. An audio cue may be detected and mapped to a first viewer, the first viewer in proximity of the one or more processing devices and an audio sensor, at least in part by one or a combination of the following. Sensor-based data that is based at least in part on the audio sensor capturing audio phenomena in the proximity may be received. A set of one or more rules specified by an operations protocol may be accessed. The set of one or more rules may include criteria for mapping a recognition of voice data to one or more operations of a content receiver. The sensor-based data may correspond to a recognition of first voice data of the first viewer. At least one rule of the set of one or more rules may be used to map the sensor-based data to at least one operation of the content receiver. Responsive to the audio cue, the content receiver may be caused to perform the at least one operation.

In another aspect, a method to facilitate adaptive voice interaction is disclosed. An audio cue may be detected and mapped to a first viewer, the first viewer in proximity of the one or more processing devices and an audio sensor, at least in part by one or a combination of the following. Sensor-based data that is based at least in part on the audio sensor capturing audio phenomena in the proximity may be received. A set of one or more rules specified by an operations protocol may be accessed. The set of one or more rules may include criteria for mapping a recognition of voice data to one or more operations of a content receiver. The sensor-based data may correspond to a recognition of first voice data of the first viewer. At least one rule of the set of one or more rules may be used to map the sensor-based data to at least one operation of the content receiver. Responsive to the audio cue, the content receiver may be caused to perform the at least one operation.

In yet another aspect, one or more non-transitory, machine-readable media are disclosed as having machine-readable instructions thereon which, when executed by one or more processing devices, cause the one or more processing devices to perform one or a combination of the following operations. An audio cue may be detected and mapped to a first viewer, the first viewer in proximity of the one or more processing devices and an audio sensor, at least in part by one or a combination of the following. Sensor-based data that is based at least in part on the audio sensor capturing audio phenomena in the proximity may be received. A set of one or more rules specified by an operations protocol may be accessed. The set of one or more rules may include criteria for mapping a recognition of voice data to one or more operations of a content receiver. The sensor-based data may correspond to a recognition of first voice data of the first viewer. At least one rule of the set of one or more rules may be used to map the sensor-based data to at least one operation of the content receiver. Responsive to the audio cue, the content receiver may be caused to perform the at least one operation.

In various embodiments, the content receiver may include the one or more processing devices and the one or more non-transitory, computer-readable storage media. In various embodiments, the sensor-based data may be used to perform voice recognition and identify the first viewer. The mapping the sensor-based data to at least one operation of the content receiver may be a function of the identifying the first viewer. In various embodiments, the voice recognition and identifying the first viewer may correspond to differentiating the first viewer from at least a second viewer. In various embodiments, the sensor-based data may be mapped to an access-right indicator configured to facilitate determination of whether particular access to the content receiver and/or particular content is to be granted. In various embodiments, the mapping the sensor-based data to at least one operation of the content receiver may be based at least in part on the access-right indicator. In various embodiments, a particularized specification of one or more recognized patterns of sensor-based data mapped to an identifier of the viewer may be adaptively developed based at least in part on processing a collection of sensor-based data. The particularized specification of the one or more recognized patterns may include one or more recognized patterns of sensor-based data. In various embodiments, the set of one or more rules specified by the operations protocol may be based at least in part on the particularized specification of one or more recognized patterns of sensor-based data mapped to the identifier.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Figure 1:
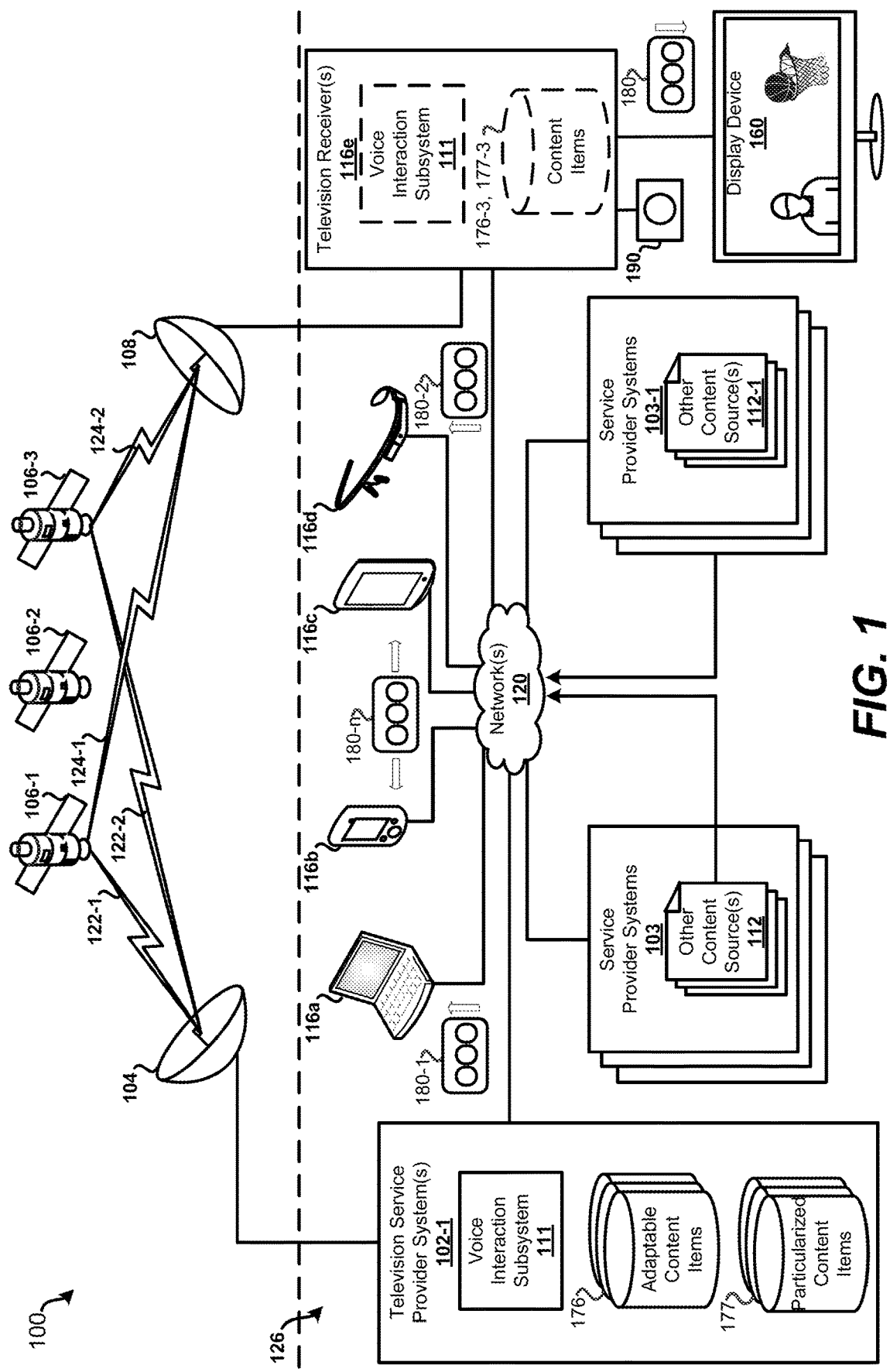
FIG. 1 illustrates a content distribution system, in accordance with disclosed embodiments of the present disclosure.

Various embodiments will now be discussed in greater detail with reference to the accompanying figures, beginning with FIG. 1. FIG. 1 illustrates a content distribution system 100, in accordance with disclosed embodiments of the present disclosure. For brevity, system 100 is depicted in a simplified and conceptual form, and may generally include more or fewer systems, devices, networks, and/or other components as desired. Further, the number and types of features or elements incorporated within the system 100 may or may not be implementation-specific, and at least some of the aspects of the system 100 may be similar to a cable television distribution system, an IPTV (Internet Protocol Television) content distribution system, and/or any other type of media or content distribution system. The system 100 may include content provider system 102-1, satellite uplink 104, a plurality of orbiting (e.g., geosynchronous) satellites 106, satellite receiver 108, one or more computing devices 116a-d, one or more television receivers 116e, one or more content sources 112 (e.g., online content sources), and service provider systems 103-1. In various embodiments, one or a combination of the one or more computing devices 116a-d, one or more television receivers 116e, and/or one or more display devices 160 may correspond to endpoint media devices 116.

The content provider system 102-1 and satellite transmitter equipment (which may include the satellite uplink 104) may be operated by a television service provider. A television service provider may distribute television channels, on-demand programing, programming information, and/or other services to users via satellite. The content provider system 102-1 may receive feeds of one or more television channels from various sources. Such television channels may include multiple television channels that contain the same content (but may be in different formats, such as high-definition and standard-definition). To distribute such television channels to users, feeds of the television channels may be relayed to user equipment via one or more satellites in the form of transponder streams. Satellite transmitter equipment may be used to transmit a feed of one or more television channels from the content provider system 102-1 to one or more satellites 106. While a single content provider system 102-1 and satellite uplink 104 are illustrated as part of the television distribution system 100, it should be understood that multiple instances of transmitter equipment may be used, possibly scattered geographically to communicate with satellites 106. Such multiple instances of satellite transmitting equipment may communicate with the same or with different satellites 106.

The television receivers 116e (also referenced herein as content receivers) as described throughout, may generally be any type of television receiver (such as an STB (set-top box), for example) configured to decode signals received for output and presentation via a display device 160. In another example, television receiver 116e (which may include another remote television receiver 116e) may be integrated as part of or into a television, a DVR, a computing device, such as a tablet computing device, or any other computing system or device, as well as variations thereof. In some embodiments, a television receiver 116e may be a component that is added into the display device 160, such as in the form of an expansion card. A television receiver 116e and network 120 together with television receivers 116e and/or one or more computing devices 116, may form at least a portion of a particular home computing network, and may each be respectively configured such as to enable communications in accordance with any particular communication protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/HDCP (High-Definition Multimedia Interface/High-Bandwidth Digital Content Protection), etc.

In some embodiments, broadcast television programs may be delivered to television receivers, including a television receiver 116e, via satellite according to a schedule. On-demand content may also be delivered to a television receiver 116e via satellite. Satellites 106 may be configured to receive uplink signals 122 from satellite uplink 104. In this example, uplink signals 122 may contain one or more transponder streams of particular data or content, such as particular television channels, each of which may be supplied by content provider system 102-1. For example, each of uplink signals 122 may contain various media content such as HD (High Definition) television channels, SD (Standard Definition) television channels, on-demand programming, programming information (e.g., table data), and/or any other content in the form of at least one transponder stream, and in accordance with an allotted carrier frequency and bandwidth. In this example, different media content may be carried using different satellites of satellites 106. Further, different media content may be carried using different transponders of a particular satellite (e.g., satellite 106-1); thus, such media content may be transmitted at different frequencies and/or different frequency ranges. For example, a first television channel and a second television channel may be carried on a first carrier frequency over a first transponder (as part of a single transponder stream) of satellite 106-1, and a third, fourth, and fifth television channel may be carried on a second carrier frequency (as part of another transponder stream) over a transponder of satellite 106-3, or, the third, fourth, and fifth television channel may be carried on a second carrier frequency over a second transponder of satellite 106-1, etc.

The satellites 106 may be further configured to relay uplink signals 122 to the satellite receiver 108 as downlink signals 124. Similar to the uplink signals 122, each of the downlink signals 124 may contain one or more transponder streams of particular data or content, such as various encoded and/or at least partially scrambled television channels, on-demand programming, etc., in accordance with an allotted carrier frequency and bandwidth. The satellite receiver 108, which may include a satellite dish, a low noise block (LNB), and/or other components, may be provided for use to receive television channels, such as on a subscription basis, distributed by the content provider system 102-1 via the satellites 106. For example, the satellite receiver 108 may be configured to receive particular transponder streams as downlink signals 124, from one or more of the satellites 106. Based at least in part on the characteristics of a given television receiver 116e and/or satellite receiver 108, it may only be possible to capture transponder streams from a limited number of transponders of the satellites 106 concurrently.

For example, a tuner of the television receiver 116e may only be able to tune to a single transponder stream from a transponder of a single satellite, such as the satellite 106-1, at a time.

The television receiver 116e, which may be communicatively coupled to the satellite receiver 108, may subsequently select, via a tuner, decode, and relay television programming to a television for display thereon. Broadcast television programming or content may be presented "live," or from a recording as previously stored on, by, or at the television receiver 116e. For example, an HD channel may be output to a television by the television receiver 116e in accordance with the HDMI/HDCP content protection technologies. Other embodiments are possible. For example, in some embodiments, an HD channel may be output to a television in accordance with the MoCA® (Multimedia over Coax Alliance) home entertainment networking standard. Other embodiments are possible.

The television receiver 116e may select via tuner, decode, and relay particular transponder streams to one or more of television receivers 116e, which may in turn relay particular transponder streams to one or more display devices 160. For example, the satellite receiver 108 and the television receiver 116e may, respectively, be configured to receive, decode, and relay at least one television channel to a television by way of a television receiver 116e. Similar to the above-example, a television channel may generally be presented "live," or from a recording as previously stored by the television receiver 116e, and may be output to the display device 160 by way of the television receiver 116e in accordance with a particular content protection technology and/or networking standard. Other embodiments are possible. In various embodiments, the content resources may be used to provide the television receiver 116e with content (e.g., television programming). The content resources may be used to retrieve television programs or portions of television programs following and/or during a live broadcast of the television programs. The content resources may include the content provider system 102-1, the service provider systems 103-1, the online content sources 112, one or more other television receivers 116e, and/or the like.

The content provider system 102-1, which may distribute broadcast television programming to the television receivers 116e via a satellite-based television programming distribution arrangement (or some other form of television programming distribution arrangement, such as a cable-based network, fiber-based network, or IP-based network), may use an alternate communication path, such as via the network 120, to provide television programming to the television receivers 116e. The television receivers 116e may be permitted to request various television programs or portions of television programs from the content provider system 102-1 via the network 120. For instance, the content provider system 102-1 may be permitted to transmit a portion of a television program or an entire television program during and/or after a time at which the television program was broadcast live by the television service provider via a satellite-based television programming distribution arrangement.

In some embodiments, the content provider system 102-1 may provide a television program via on-demand content. On-demand content may be included in a user's subscription or may be provided on a per-request basis. Such on-demand content may be provided via the satellite-based distribution arrangement and/or via the network 120. On-demand content provided via the satellite-based distribution arrangement may be stored locally by the television receiver 116e to allow on-demand access. On-demand content may also be retrieved via the network 120 from the content provider system 102-1.

The computing devices 116a-d represent various computerized devices that may or may not be associated with a user of the television receiver 116e and that may be configured to facilitate various features disclosed in various embodiments herein. In various embodiments, one or more of the computing devices 116a-d may be configured as content receivers and may facilitate one or a combination of the features disclosed herein with respect to the television receiver 116e, in alternative to or in addition to the television receiver 116e. As indicated by 116a-, the computing devices 116a-d may include a laptop computer, a desktop computer, a home server, a smart speaker, or another similar form of computerized device. As indicated by 116b and 116c, the computing devices 116a-d may include a cellular phone and/or smartphone, a tablet computer, or another similar form of mobile device. As indicated by 116d, the computing devices 116a-d may include smart glasses or another similar form of wearable computing device.

In various embodiments, one or a combination of the computing devices 116a-e (content receivers) and/or display(s) 160 may correspond to an end-user subsystem. The end-user subsystem may further include one or more sensor devices 190. While a sensor 190 is depicted as separate from the television receiver 116e, one or more sensors 190 may be part of one or more television receivers 116e and/or may be separate but communicatively coupled to the one or more television receivers 116e (via wired and/or wireless communication channel(s)). Likewise, one or more sensors 190 may be integrated with or otherwise communicatively coupled to one or more other content receivers 116 (e.g., 116a-116d) via wired and/or wireless communication channel(s). The one or more sensor devices 190 may include one or more microphones and/or other audio sensors (which may or may not be dedicated to capturing audio data for audio analysis) configured to capture audio phenomena in proximity to the one or more content receivers 116 to facilitate the voice interaction features disclosed herein. The one or more content receivers 116 may be configured to receive sensor data from one or more sensors 190 and/or other computing devices communicatively coupled to one or more sensors 190, such as smart speakers and/or the like. Communications with the one or more sensors 190 may use different communication standards or protocols in various embodiments. In various embodiments, sensors 190 and/or sensor 190 control units may be wired or wirelessly coupled to the one or more content receivers 116 a serial, parallel, star, hierarchical, and/or the like topologies and may communicate to the one or more content receivers 116 via one or more serial, bus, or wireless protocols and technologies which may include, for example, Wi-Fi, CAN bus, Bluetooth, I2C bus, ZigBee, Z-Wave and/or the like.

In various embodiments, the television receiver 116e may be provided with access credentials that allow access to content stored and/or accessible through one or more of the computing devices 116a-d. Likewise, in various embodiments, one or more of the computing devices 116a-d may be provided with access credentials that allow access to content stored and/or accessible through the television receiver 116e and/or account associated therewith and/or associated with an application installed on the one or more of the computing devices 116a-d. It should be understood that computing devices 116a-dare exemplary in nature. Content may be accessible through a lesser or greater number of computerized devices associated with a user of the television receiver 116e.

In some embodiments, the online content sources 112 may represent content resources through which content may be retrieved by the endpoint media devices 116 via the network 120. Content available through the online content sources 112 may be available for free and not require subscription (a username and/or password may or may not be necessary). Each of the online content sources 112 may represent different websites available via the Internet. For example, some content may be legally made available for free (such as television programming provided by government-funded sources, e.g., the BBC or Hulu®). Periodically, the endpoint media devices 116 may poll online content sources 112 to determine which content is available and/or which content is scheduled to be available in the future. In some embodiments, the endpoint media devices 116 may poll online content sources 112 regarding the availability of at least a portion of a specific show.

The service provider systems 103-1 may correspond to one or more data sources 112, any suitable sources of data such as one or more computer systems, databases, websites, portals, any repositories of data in any suitable form, server systems, other endpoint devices like endpoint devices 116 but functioning as data sources, and/or the like that are any suitable source of data to facilitate embodiments disclosed further herein. In various embodiments, the service provider systems 103-1 may include one or more computer systems, a database, a website, a portal, any repository of data in any suitable form, a server system, and/or the like. With some embodiments, the data sources 112 may include one or more mobile computing device locator services that provide information regarding the location of one or more computing devices 116a-d. With some embodiments, the data sources 112 may provide various details relating to IP addresses, cellular tower identification and location data, mobile device triangulation data, LAN identification data, Wi-Fi identification data, access point identification and location data, and/or the like data that facilitates location of one or more computing devices 116a-d. With some embodiments, the data sources 112 may provide demographic data about an area encompassing the location of one or more computing devices 116a-d.

In various embodiments, the data from one or more of the data source systems 103 may be retrieved and/or received by a television service provider system 102 via one or more data acquisition interfaces through network(s) 120 and/or through any other suitable means of transferring data. In various embodiments, the television service provider system 102 the data source systems 103 could use any suitable means for direct communication. In various embodiments, the television service provider system 102 may actively gather and/or pull from one or more of the data source systems 103. Additionally or alternatively, the television service provider system 102 may wait for updates from one or more of the data source systems 103. The data collected (location data, IP address, etc.) may be curated so that only the data necessary for the transaction is collected. The one or more data acquisition interfaces may include one or more application programming interfaces (APIs) that define protocols and routines for interfacing with the data source systems 103. The APIs may specify application programming interface (API) calls to/from data source systems 103. In some embodiments, the APIs may include a plug-in to integrate with an application of a data source systems 103. The data acquisition interfaces, in some embodiments, could use a number of API translation profiles configured to allow interface with the one or more additional applications of the data sources to access data (e.g., a database or other data store) of the data source systems 103. The API translation profiles may translate the protocols and routines of the data source systems 103 to integrate at least temporarily with the system and allow communication with the system by way of API calls.

Although FIG. 1 illustrates an example that includes a satellite-based television channel distribution system, it should be understood that at least some of the aspects of such a system may be similar to a cable television distribution system, an IPTV content distribution system, and/or any other type of media or content distribution system. For example, in a cable television system, rather than using satellite transponders, multiple RF channels on a cable may be used to transmit streams of television channels. As such, aspects detailed herein may be applicable to cable television distribution systems.

Further, the content provider system 102-1 may include one or more content server systems configured to stream television programming, including televised events such as sports events, to the computing devices 116 via the network 120. When the streaming content servers stream content to the computing devices 116, the stream content may be processed and displayed by the computing devices 116 using one or more applications installed on the computing devices 116. Some such streaming services may require a subscription and may require user authentication, e.g., with a username and/or password which may or may not be associated with an account map to the television receiver 116e. Accordingly, the streaming services may make a television program available for streaming or download during the live broadcast of the television program.

The television receiver 116e may be able to retrieve at least a portion of a television program through other television receivers 116e, which can function as content resources.

Similarly, the television receiver 116e may be able to cast at least a portion of a television program through other television receivers 116e and/or to computing devices 116. For instance, a Slingbox® (or other form of media streaming device) functioning in concert with a television receiver 116e may permit television programs to be captured and streamed over the network 120. In some embodiments, the television receivers 116e may have such media streaming capabilities integrated. In some embodiments, the television receivers 116e may cast programming content to the computing devices 116 via wireless signals. For example, the programming content from the television receiver 116e may be indirectly transmitted via a local network (e.g., via Wi-Fi) or directly transmitted to the computing device 116 via a casting device integrated with the television receiver 116e or coupled to the television receiver 116e (e.g., via a dongle). In some embodiments, the programming content may be cast to the computing device 116 via a wired connection (e.g., via one or more of HDMI, USB, lightning connector, etc.). Some embodiments of the television receivers 116e may provide for simulcasting such that the same programming that is being displayed on the display device 160 is being displayed on one or more of the computing devices 116 simultaneously or substantially simultaneously.

The content provider system 102-1 may include a voice interaction subsystem 111 in whole or in part. In some embodiments, additionally or alternatively, one or more of the endpoint media devices 116 may include a voice interaction subsystem 111 in whole or in part. The extent to which the media devices 116 may be configured to provide features of the subsystem 111 (e.g., by way of software updates and communications from the system 102-1) may depend on the processing power and storage capabilities of a given device 116. The system 102-1 may communicate with a given device 116 to pull specifications and current device capability information from the device 116. Based on such communications, the system 102-1 may determine the extent to which the device 116 can be configured to provide features of the subsystem 111 and may operate accordingly. For example, the system 102-1 may push one or more software packages to the device 116 to configure the device 116 to provide a set of one or more features of the subsystem 111. In instances where the device 116 is determined by the system 102-1 to lack sufficient processing and/or storage capabilities, the subsystem 111 may operate on the system 102-1. As one example with respect to many features disclosed herein, when the device 116 lacks sufficient resources to perform the operations itself, the backend system 102-1 may perform one or a combination of: detecting an audio cue mapped to a first viewer, the first viewer in proximity of the one or more processing devices and an audio sensor; receiving sensor-based data that is based at least in part on the audio sensor capturing audio phenomena in the proximity; accessing a set of one or more rules specified by an operations protocol, the set of one or more rules comprising criteria for mapping a recognition of voice data to one or more operations of a device 116 (content receiver), the sensor-based data corresponding to a recognition of first voice data of the first viewer; using at least one rule of the set of one or more rules, mapping the sensor-based data to at least one operation corresponding to an activation adjustment of the content receiver; and/or responsive to the audio cue, causing the content receiver 116 to perform the at least one operation corresponding to an activation adjustment. Further, in some embodiments, additionally or alternatively, one or more service provider systems 103-1 may include a voice interaction subsystem 111 in whole or in part. The voice interaction subsystem 111 may be configured to facilitate various voice interaction features in accordance with various embodiments disclosed herein.

Accordingly, in various embodiments, the system 102 and/or the endpoint media device(s) 116 with the voice interaction subsystem 111 may be configured to perform one or more methods for facilitating adaptive voice interaction, as disclosed herein. In various embodiments, part or all of the method may be performed while an endpoint media device 116 is receiving programming content and/or is outputting programming content for display. In various embodiments, at least part of the method may be performed in advance of the programming content and, thus, may be performed while is scheduled to output programming content but before the programming content is broadcast to endpoint media devices 116 and/or before the programming content output by an endpoint media device 116 for display. In various embodiments, one or more media devices (e.g., the devices 116a-e and/or the system 102-1) may perform all or part of the method, with a single media device or multiple media devices performing the method.

The content provider system 102-1 may include one or more adaptable content item 176 repositories and/or particular content item 177 repositories. The content provider system 102-1 may store adaptable content items 176 and/or particular content item 177 in the one or more repositories. The one or more repositories may be implemented in various ways. For example, one or more data processing systems may store adaptable content items. One or more relational or object-oriented databases, or flat files on one or more computers or networked storage devices, may store adaptable content items. In some embodiments, a centralized system stores adaptable content items; alternatively, a distributed/cloud system, network-based system, such as being implemented with a peer-to-peer network, or Internet, may store adaptable content items.

Adaptable content items 176 and/or particularized content items 177 may correspond to any one or combination of raw data, unstructured data, structured data, information, and/or content which may include media content, text, documents, files, instructions, code, executable files, images, video, audio, audio video, and/or any other suitable content suitable for embodiments of the present disclosure. For example, the content items 176 may be adaptable content items that may correspond to visual and/or audiovisual announcements with graphical and/or audio components particularized to certain languages, accents, dialects, and/or keywords, which may be detected and recognized by the voice interaction subsystem 111. In some embodiments, the announcements may correspond to commercials to be presented during commercial breaks of television programming, such as televised events. In some instances, the content items 176 may be sourced by one or more of the service provider systems 103-1.

In some embodiments, the adaptable content items 176 may correspond to video and/or audio video file structures with one or more transition points, hooks, frames, windows, and/or the like for merging with one or more particularized content items, content items 177, particularized to certain languages. As disclosed herein, the adaptable content items 176 may be merged, blended, joined, overlaid, customized, and/or the like in any suitable manner with other particularized content items 177 in order to create electronic content composites 180 particularized to certain languages. In various embodiments, as further disclosed herein, the adaptable content items 176 and/or the other content items 177 may be formatted, rescaled, cropped, image characteristic (e.g., color, brightness, transparency, opaqueness, contrast, etc.) adjusted, and/or otherwise prepared to facilitate the merging, blending, joining, overlaying, customizing, and/or the like and presentation by endpoint media devices 116 as disclosed herein.

In various embodiments, the particularized content items 177 may correspond to content that is particularized to certain languages and that, in various embodiments, may be sourced by one or combination of the system 102, one or more of the service provider systems 103-1, and/or another endpoint media device 116 (e.g., in instances where user-generated content may form at least part of a particularized content item 177). In various embodiments, the service provider systems 103-1 may correspond to one or more sources of data and/or services corresponding to the adaptable content items 176 and/or the particularized content items 177, and particularized content items 177 may correspond to the specific data and/or services sourced by a specific service provider system 103-1. As disclosed above, the adaptable content items 176 and/or the content items 177 may correspond to any one or combination of raw data, unstructured data, structured data, information, and/or content which may include media content, text, documents, files, instructions, code, executable files, images, video, audio, audio video, and/or any other suitable content suitable for embodiments of the present disclosure.

In various embodiments, content items 176 and/or 177 may be actively gathered and/or pulled from one or more data sources 112, for example, by accessing a repository and/or by "crawling" various repositories. Additionally or alternatively, the content provider system 102-1 and/or the subsystem(s) 111 may wait for updates from one or a combination of the content source systems 112. Content items 176 and/or 177 pulled and/or pushed from the one or more data sources 112 may be transformed, and the transformed content items 176 and/or 177 and/or other data generated based thereon may be made available by the content provider system 102-1 and/or the subsystem(s) 111 for use by the subsystem(s) 111 in conjunction with content composites 180.

In some embodiments, the content provider system 102-1 may provide the adaptable content items 176 and, in some embodiments, the particularized content items 177, to the endpoint media device 116 as part of a data transfer that is sent through the satellite 106. For example, in some embodiments, the television receiver 116e may receive a down-linked satellite signal that includes the data for adaptable content items 176 and/or particularized content items 177 transferred on a designated line in the vertical blanking interval (VBI) or other portion of the broadcast service transmission that does not interfere with other transmitted content. Additionally or alternatively, the content provider system 102-1 may provide adaptable content items 176 and/or particularized content items 177 to the television receiver 116e via the one or more data networks 120. In some embodiments, the content provider system 102-1 may store the adaptable content items 176 and/or particularized content items 177 in an adaptable content item 176 repository and/or a particularized content items 177 repository included in or otherwise accessible to the content provider system 102-1. In some embodiments, the television receiver 116e may store the adaptable content items 176 and/or particularized content items 177 in an adaptable content item 176 repository and/or a particularized content items 177 repository included in the television receiver 116e or otherwise local to the television receiver 116e. Consequently, the television receiver 116e may use one or more of the adaptable content items 176 and one or more of the particularized content items 177 in accordance with embodiments disclosed herein. In some embodiments, additionally or alternatively to providing the adaptable content items 176 and/or particularized content items 177, the content provider system 102-1 may provide content composites 180 to the television receiver 116e through such means.

One or more content composites 180 may be created to facilitate delivery of the composite 180 and display of one or more content items 176 (in some instances, as modified with particular items 177) in conjunction with the televised event or other type of audiovisual content (movies, shows, etc.). One or more indicators of one or more state changes with respect to the content (e.g., event that is televised, show, etc.) may be detected. The one or more state changes may include upcoming state changes, such as commercial breaks upcoming within a time threshold (e.g., a number of seconds and/or minutes). In some embodiments, the one or more content composites 180 may be created and/or delivered consequent to the detecting the one or more state changes. In some embodiments, the one or more content items 176 may be adapted with one or more particular items 177 consequent to the detecting the one or more state changes.

In some embodiments, the creating the content composite 180 and/or the adaptation of the one or more content items 176 with one or more particular items 177 may be a function of a current set of one or more languages, accents, dialects, and/or keywords, which may be detected and recognized by the voice interaction subsystem 111 as being used by one or more viewers proximate to the computing device 116, with a set of rules mapped to the set of one or more languages, accents, dialects, and/or keywords, and specifying criteria for creating content composites 180, selecting content items 176 and particularized content items 177, adapting the content items 176 with particularized content items 177, and provisioning the content items 176 and particularized content items 177. With the content composite 180 created and, in some instances, the one or more content items 176 adapted, the one or more content items 176 corresponding to the programming content may be output for display, e.g., during the commercial break, where the content items 176 and particularized content items 177 are selected based at least in part on language metadata mapped to the content items 176 and particularized content items 177 specifying language indicia for the content items 176 and particularized content items 177.

Figure 2:
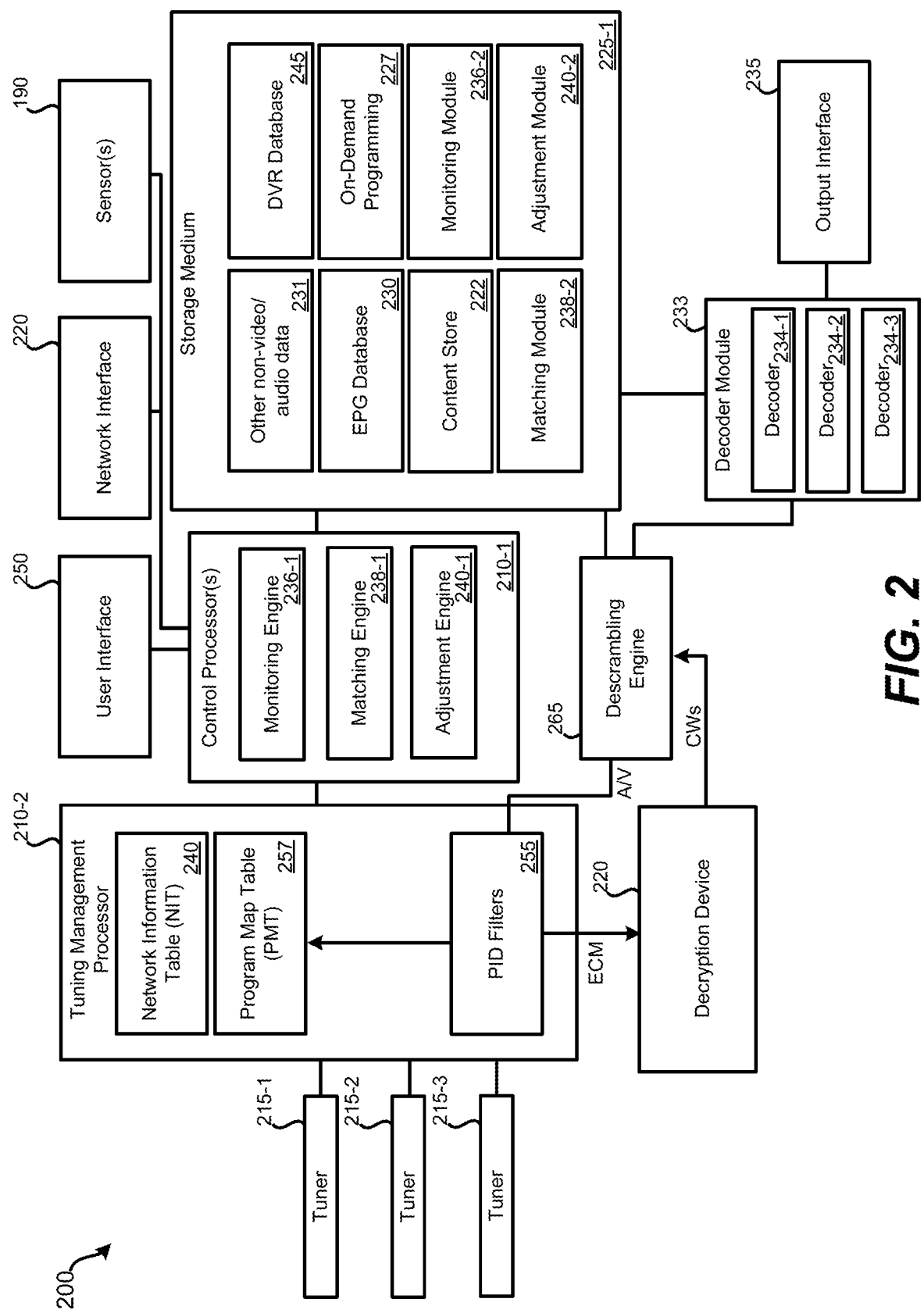
FIG. 2 illustrates a content receiver that makes use of, interacts with, includes, and/or at least partially includes the subsystem, in accordance with disclosed embodiments of the present disclosure.

FIG. 2 illustrates a content receiver 200 that makes use of, interacts with, includes, and/or at least partially includes the subsystem 111, in accordance with disclosed embodiments of the present disclosure. Certain embodiments of the receiver 200 may include set top boxes (STBs), television receivers, and over-the-top receivers. In some embodiments, the receiver 200 may correspond to the television receiver 116e. In various embodiments, a content receiver 200 may be incorporated as part of another device 116, such as a television or other form of display device, such as a computer 116a, smartphone 116b, tablet 116c, or other handheld portable electronic device 116d. In some examples, a television may have an integrated content receiver 200 (which does not involve an external STB being coupled with the television).

The receiver 200 may include, or otherwise be communicatively coupled via wired or wireless connections to, one or more sensor devices 190. As disclosed herein, the one or more sensor devices 190 may include one or more microphones and/or other audio sensors (which may or may not be dedicated to capturing audio data for audio analysis) configured to capture audio phenomena in proximity to the receiver 200, to generate audio/sound data corresponding to detected phenomena, and to facilitate the voice interaction features disclosed herein. The receiver 200 may be configured to receive sensor data from the one or more sensors 190 and/or other computing devices communicatively coupled to one or more sensors 190, such as smart speakers, another computing device 116, and/or the like. The sensor data may be received and processed by the receiver 200. One or a combination of the monitoring engine 236-1, the matching/learning engine 238-1, and/or adjustment engine 240-1, which may be provided in conjunction with monitoring module 236-2, the matching/learning module 238-2, and/or adjustment module 240-2 to implement various functionalities of the voice interaction subsystem 111 into the receiver 200. Accordingly, the receiver 200 may use the sensor data to facilitate various audio-detection-based features disclosed herein.

The receiver 200 may represent receiver 116e of FIG. 1 and may be in the form of a STB that communicates with a display device such as a television. The receiver 200 may be incorporated as part of a television, such as the display device 160 of FIG. 1. The receiver 200 may include: processors 210 (which may include control processor 210-1, tuning management processor 210-2, and possibly additional processors), tuners 215, network interface 220, non-transitory computer-readable storage medium 225, electronic programming guide (EPG) database 230, networking information table (NIT) 240, digital video recorder (DVR) database 245, on-demand programming 227, content store 222-3, user interface 250, decryption device 260, decoder module 233, interface 235, and/or descrambling engine 265. In other embodiments of receiver 200, fewer or greater numbers of components may be present. It should be understood that the various components of receiver 200 may be implemented using hardware, firmware, software, and/or some combination thereof. Functionality of components may be combined; for example, functions of descrambling engine 265 may be performed by tuning management processor 210-2. Further, functionality of components may be spread among additional components; for example, PID filters 255 may be handled by separate hardware from program map table 257. The receiver 200 may be in data communication with service providers, such as by way of network interface 220.

The processors 210 may include those configured to perform processes such as tuning to a particular channel, accessing and displaying EPG information from the EPG database 230, and/or receiving and processing input from a user. For example, the processors 210 may include one or more processors dedicated to decoding video signals from a particular format, such as MPEG, for output and display on a television and for performing decryption, if required. It should be understood that the functions performed by various modules may be performed using one or more processors. As such, for example, functions of the descrambling engine 265 may be performed by the control processor 210-1.

The control processor 210-1 may communicate with tuning management processor 210-2. The control processor 210-1 may control the recording of television channels based at least in part on timers stored in the DVR database 245. The control processor 210-1 may also provide commands to the tuning management processor 210-2 when recording of a television channel is to cease. In addition to providing commands relating to the recording of television channels, the control processor 210-1 may provide commands to the tuning management processor 210-2 that indicate television channels to be output to the decoder module 233 for output to a display device. The control processor 210-1 may also communicate with the network interface 220 and the user interface 250. The control processor 210-1 may handle incoming data from network interface 220, including network transport streams received from over-the-top service providers. The control processor 210-1 may handle incoming data from the network interface 220, including network transport streams received from the user interface 250, which may include user input received by way of one or more human interface devices. Additionally, the control processor 210-1 may be configured to output data via the network interface 220. The control processor 210 may also be configured to perform image and audio analysis, such as to identify contextual aspects present in an audio or video stream, for example facial recognition or voice recognition.

The tuners 215 may include one or more tuners used to tune to transponders that include broadcasts of one or more television channels that may be received from a satellite or cable system, for example. In the illustrated embodiment of receiver 200, three tuners are present (tuner 215-1, tuner 215-2, and tuner 215-3). In other embodiments, two or more than three tuners may be present, such as four, six, or eight tuners. Each tuner contained in the tuners 215 may be capable of receiving and processing a single transponder stream from a satellite transponder at a given time, for example. As such, a single tuner may tune to a single transponder stream at a given time. If the tuners 215 include multiple tuners, one tuner may be used to tune to a television channel on a first transponder stream for display using a television, while another tuner may be used to tune to a television channel on a second transponder for recording and viewing at some other time. If multiple television channels transmitted on the same transponder stream are desired, a single tuner of the tuners 215 may be used to receive the signal containing the multiple television channels for presentation and/or recording. The tuners 215 may receive commands from the tuning management processor 210-2. Such commands may instruct the tuners 215 which frequencies are to be used for tuning.

The network interface 220 may be used to communicate via an alternate communication channel with a television service provider, if such communication channel is available. The primary communication channel may be via satellite (which may be unidirectional to the receiver 200) and the alternate communication channel (which may be bidirectional) may be via a network, such as the Internet. Referring back to FIG. 1, receiver 116e may be able to communicate with content provider system 102-1 via a network 120, such as the Internet. This communication may be bidirectional: data may be transmitted from the receiver 116e to the content provider system 102-1 and from the content provider system 102-1 to the receiver 116e. Referring back to FIG. 2, the network interface 220 may be configured to communicate via one or more networks, such as the Internet, to communicate with content provider system 102-1 of FIG. 1. Other information may be transmitted and/or received via the network interface 220 such as adaptable content items 176, content items 177, metadata, and/or the like as disclosed herein.

The storage medium 225 may represent one or more non-transitory computer-readable storage mediums. The storage medium 225 may include memory and/or a hard drive. The storage medium 225 may be used to store information received from one or more satellites and/or information received via the network interface 220. The storage medium 225 may store information related to the EPG database 230, the monitoring module 236-2, the matching/learning module 238-2, the adjustment module 240-2, other non-video/audio data 231, DVR database 245, content store 222, and/or on-demand programming 227. Recorded television programs may be stored using the storage medium 225 as part of the DVR database 245. The storage medium 225 may be partitioned or otherwise divided (such as into folders) such that predefined amounts of the storage medium 225 are devoted to storage of television programs recorded due to user-defined timers and stored television programs recorded due to provider-defined timers.

The EPG database 230 may store information related to television channels and the timing of programs appearing on such television channels. The EPG database 230 may be stored using the storage medium 225, which may be a hard drive. Information from the EPG database 230 may be used to inform users of what television channels or programs are popular and/or provide recommendations to the user. Information from the EPG database 230 may provide the user with a visual interface displayed by a television that allows a user to browse and select television channels and/or television programs for viewing and/or recording. Information used to populate the EPG database 230 may be received via the network interface 220 and/or via satellites, such as the satellite 106 of FIG. 1 via the tuners 215. For instance, updates to the EPG database 230 may be received periodically via satellite. The EPG database 230 may serve as an interface for a user to control DVR functions of the receiver 200, and/or to enable viewing and/or recording of multiple television channels simultaneously. Information from EPG database 230 may be output as a video stream to a display device. A particular user may issue commands indicating that an EPG interface be presented. A user issuing a command that an EPG be displayed may constitute a change command. In some embodiments, content composites 180 may be created and presented in conjunction with the EPG. For example, content composites 180 could pertain to televised events indicated in the EPG. Hence, content composite 180 features may extend to EPG views in some embodiments.

The network information table (NIT) 240 may store information used by the receiver 200 to access various television channels. The NIT 240 may be stored locally by a processor, such as the tuning management processor 210-2 and/or by the storage medium 225. Information used to populate the NIT 240 may be received via satellite (or cable) through the tuners 215, may be received via the network interface 220, such as from the television service provider. As such, information present in the NIT 240 may be periodically updated. In some embodiments, NIT 240 may be locally-stored by the receiver 200 using the storage medium 225. Generally, the NIT 240 may store information about a service provider network, such as a satellite-based service provider network. Information that may be present in the NIT 240 may include: television channel numbers, satellite identifiers (which may be used to ensure different satellites are tuned to for reception of desired television channels), frequency identifiers, transponder identifiers for various television channels, antenna identifiers (which may be used to ensure different antennas are tuned to for reception of desired television channels), radio frequency identifiers, and/or subchannel identifiers for various television channels. In some embodiments, the NIT 240 may contain additional data or additional tables may be stored by the receiver. For example, while specific audio PIDs and video PIDs may not be present in the NIT 240, a channel identifier may be present within the NIT 240 which may be used to look up the audio PIDs and video PIDs in another table, such as a program map table (PMT) 257.

The output interface 235 may serve to output a signal to a television (or another form of display device) in a proper format for display of video and playback of audio. As such, the output interface 235 may output one or more television channels, stored television programming from the storage medium 225 and/or information from the storage medium 225 to a display device for presentation.

Digital Video Recorder (DVR) functionality may permit a television channel to be recorded for a period of time. DVR functionality of the receiver 200 may be managed by the control processor 210-1. The control processor 210-1 may coordinate the television channel, start time, and stop time of when recording of a television channel is to occur. In various embodiments, adaptable content items 176 could be selected and inserted into the presentation stream prior to recording, during recording, and/or upon playback of the recording. The DVR database 245 may store information related to the recording of television channels. The DVR database 245 may store timers that are used by the control processor 210-1 to determine when a television channel should be tuned to and its programs recorded to the DVR database 245 of storage medium 225. In some embodiments, a limited amount of the storage medium 225 may be devoted to the DVR database 245. Timers may be set by the television service provider and/or one or more users of the receiver 200.

User/viewer profiles may also be stored in the storage medium 225 and may include stored user preferences that may be inferred by the receiver 200 based at least in part on audio detection features disclosed herein. The receiver 200 may communicate user profile information to the service system(s) 102-1, 103-1 to request adaptable content items 176 and content items 177 tailored to the detected languages, accents, dialects, and/or keywords to provision composites 180 in accordance with certain embodiments disclosed herein. The user/viewer profiles may further include user feedback, via user-selectable options, received from the user regarding customizations. The feedback data may be used to refine the customizations for particular viewers and types of customizations regarding features disclosed herein.

The on-demand programming 227 may represent additional television programming stored by the storage medium 225. The on-demand programming 227 may include television programming that was not recorded to the storage medium 225 via a timer (either user- or provider-defined). Rather, on-demand programming is programming provided to the receiver directly for storage by the receiver and for later presentation to one or more users. In various embodiments, adaptable content items 176 could be selected and inserted into the presentation stream prior to or upon playback of the recording.

The user interface 250 may include a remote control (physically separate from the receiver 200) and/or one or more buttons on the receiver 200 that allow a user to interact with the receiver 200. The user interface 250 may be used to select a television channel for viewing, view information from the EPG database 230, and/or program a timer stored to DVR database 245, wherein the timer is used to control the DVR functionality of the control processor 210-1. The user interface 250 may also be used to transmit commands to the receiver 200 and make user selections of interface elements to provide user input regarding any one or a combination of features disclosed herein.

The tuning management processor 210-2 may be in communication with the tuners 215 and the control processor 210-1. The tuning management processor 210-2 may be configured to receive commands from the control processor 210-1. Such commands may indicate when to start/stop recording a television channel and/or when to start/stop causing a television channel to be output to a television. The tuning management processor 210-2 may control the tuners 215. From the tuners 215, the tuning management processor 210-2 may receive transponder streams of packetized data. From the network interface 220, the tuning management processor 210-2 may receive network transport stream of packetized data.

For simplicity, the receiver 200 of FIG. 2 has been reduced to a block diagram; commonly known parts have been omitted. Further, some routing between the various modules of the receiver 200 has been illustrated. Such illustrations are for exemplary purposes only. The state of two modules not being directly or indirectly connected does not indicate the modules cannot communicate. Rather, connections between modules of the receiver 200 are intended only to indicate possible common data routing. It should be understood that the modules of the receiver 200 may be combined into a fewer number of modules or divided into a greater number of modules.

Further, the components of the television receiver 200 may be part of another device, such as built into a television. The television receiver 200 may include one or more instances of various computerized components, such as disclosed in relation to computer systems disclosed further herein. While the television receiver 200 has been illustrated as a satellite receiver, it is to be appreciated that techniques below may be implemented in other types of television receiving devices, such as cable receivers, terrestrial receivers, IPTV receivers or the like computing devices 116. In some embodiments, the television receiver 200 may be configured as a hybrid receiving device, capable of receiving content from disparate communication networks, such as satellite and terrestrial television broadcasts. In some embodiments, the tuners may be in the form of network interfaces capable of receiving content from designated network locations.

Figure 3:
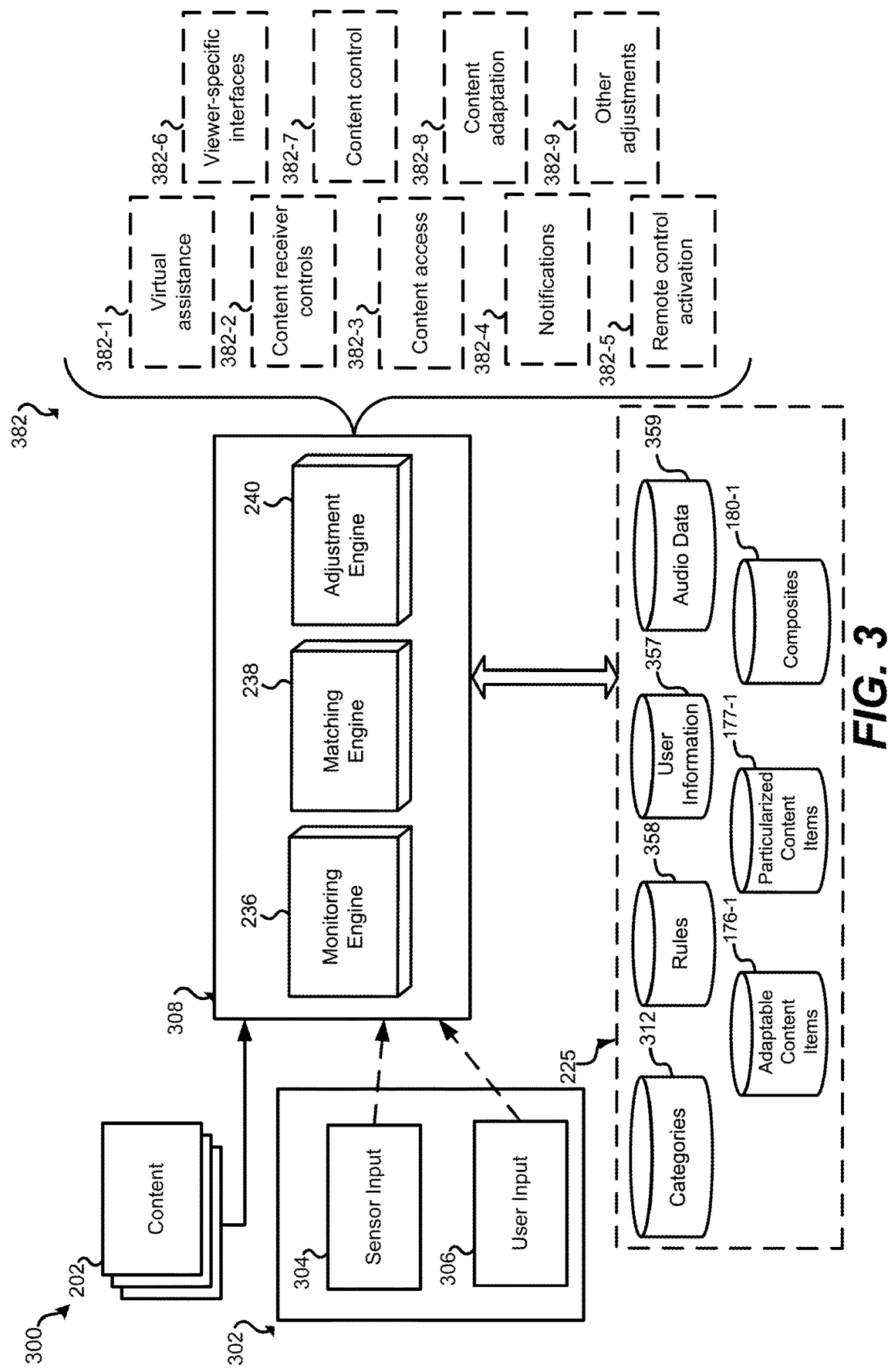
FIG. 3 illustrates a diagram of an adaptive voice interaction system, in accordance with disclosed embodiments of the present disclosure.

FIG. 3 illustrates a functional diagram of an adaptive voice interaction system 300, in accordance with disclosed embodiments of the present disclosure. While the subsystem 300 is illustrated as being composed of multiple components, it should be understood that the subsystem 300 may be broken into a greater number of components or collapsed into fewer components. Each component may include any one or combination of computerized hardware, software, and/or firmware. In various embodiments, the voice interaction system 300 may be included in whole or in part in the content provider system 102-1 and/or an endpoint media device 116. In some embodiments, the voice interaction system 300 may be separate from, and provide content to, the content provider system 102-1. In some embodiments, the voice interaction system 300 may be included in the end-user system and may be included in the television receiver 116*e* and/or one or more of the computing devices 116. In some embodiments, various features of the voice interaction system 300 may be distributed between the television receiver 116*e* and upstream of the television receiver 116*e*. Likewise, in some embodiments, various features of the voice interaction system 300 may be distributed between one or more of the computing devices 116 and upstream of the one or more computing devices 116. While not all components of the adaptive voice interaction system 300 are shown, the system 200 may include one or a combination of such components.

The voice interaction system 300 may provide for voice recognition features, including learning and recognizing different viewers, learning and adapting to viewer actions, learning and associating rules, customizations, and actions. As disclosed herein, embodiments according to the present disclosure provide technological solutions to multiple problems existing with conventional systems and approaches. Conventional systems and approaches are deficient in timeliness, adaptability, sensitivity, responsiveness, and access to voice interaction and control with content receivers 116. The technical improvements provided by the system 100 include improvements in timeliness, adaptability, sensitivity, and responsiveness in machine control for voice interaction and control with content receivers 116 based at least in part on adaptive machine-based control that is based at least in part on a learned endpoint audio, voice, and user access patterns, causes real-time activation adjustments 382.

The voice interaction system 300 may include the voice interaction subsystem 111. The voice interaction subsystem 111 may include or otherwise correspond to a system control engine 308 that, as with disclosed embodiments of the other engines, may include instructions retained in processor-readable media and to be executed by one or more processors. The voice interaction subsystem 111 may be communicatively coupled with interface components and communication channels (e.g., of the television receiver 116*e* and/or the computing device 116, which may take various forms in various embodiments as disclosed herein) configured to receive programming content 202, which may correspond to televised sporting events, movies, television programs, portions thereof, etc. In various embodiments, the programming content 202 may include audiovisual content broadcast and/or otherwise transmitted by the content provider system 102-1 and/or one or more other service providers 103-1. The programming content 202 may include various components, including without limitation, one or more video tracks, audio tracks, audio video tracks, metadata tracks, close captioning information, and/or the like. In some embodiments, the voice interaction system 300 may retain received programming content 202 in content storage 222. The content storage 222 may include any suitable form of storage media, such as any suitable form disclosed herein.

In some embodiments, the voice interaction system 300 may correspond to a content receiver system to facilitate adaptive voice interaction. The voice interaction system 300 may perform a method of facilitating adaptive voice interaction. In some embodiments, the system control engine 308 may include or otherwise correspond to an audiovisual control engine. The system control engine 308 may be communicatively coupled with interface components and communication channels (which may take various forms in various embodiments as disclosed herein) configured to receive adjustment input 302. Based at least in part on receiving and processing the adjustment input 302, the system control engine 308 may detect one or more audio cues mapped to one or more particular individuals located in proximity to one or more sensors 190 and/or one or more devices 116 (e.g., within a certain range, such as a range of detection of one or more sensors 190, in the same room as one or more sensors 190 and/or devices 116, in one or more rooms adjacent to the room with one or more sensors 190 and/or devices 116, and/or the like).

The adjustment input 302 may include user input 306. The user input 306 may include indicia of user specifications and customizations as disclosed herein. One or more storage repositories 225 may store one or more viewer profiles 357. Viewer profiles 357 may include learned and inferred conclusions regarding viewers. The profiles 357 may further include user feedback received from the user regarding customizations. The feedback data may be used to refine the customizations for particular individuals and situations.

The adjustment input 302 may include sensor input 304. The sensor input 304 may be captured by the one or more sensors 190. The subsystem 300 may process sensor input 304 and analyze the sensor input 304 to provide for adaptive control features disclosed herein. For example, the subsystem 300 may detect one or more audio cues mapped to one or more particular individuals located in proximity at least in part by receiving and processing sensor-based data that is based at least in part on one or more audio sensors 190 capturing audio phenomena in the proximity. To facilitate such features, the control engine 308 may include a monitoring engine 226 configured to monitor the adjustment input 302 for any suitable aspects pertaining to audio phenomena at a premises. In various embodiments, the monitoring engine 226 may correspond to the monitoring engine 226-1 and/or monitoring module 226-2.

The control engine 308 may include a matching engine 238. In various embodiments, the matching engine 238 may correspond to the matching engine 228-1 and/or matching module 228-2. The matching engine 238 may perform any one or combination of sound recognition, voice recognition, volume detection, location detection, and/or the like. The matching engine 238 may correspond to a learning engine that includes logic to implement and/or otherwise facilitate any taxonomy, classification, categorization, correlation, mapping, qualification, scoring, organization, and/or the like features disclosed herein. In various embodiments, the matching engine 238 may be configured to analyze, classify, categorize, characterize, tag, and/or annotate sensor-based data. The matching engine 238 may employ one or more artificial intelligence (machine learning or, more specifically, deep learning) algorithms to perform pattern matching to detect patterns of metrics of the sensor-based data.

In some embodiments, the matching engine 238 may perform the voice recognition. For example, the voice data received by the monitoring engine 236 may be recognized by the matching engine 238 as having a set of one or more acoustic features of one or more unique viewers. In some embodiments, the matching engine 238 may create and/or develop sets of rules based at least in part on the learning of the matching engine 238. For example, the matching engine 238 may recognize particular voice characteristics of voice data sensed and map the particular voice characteristics to a particular individual, mapping one or more operations of a content receiver 116 to the particular individual, and create/develop pattern data corresponding to such mappings. The mapping of the one or more operations of the content receiver 116 to the particular individual may be based at least in part on the voice data corresponding to user commands resulting in the one or more operations and/or the voice data and the one or more operations having temporal proximity (e.g., being both detected within a particular time window of, say, 30 seconds, 1 minute, 5 minutes, 30 minutes, and/or the like).

Using at least one rule of the set of one or more rules, the matching engine 238 may map the sensor-based data to at least one operation of the content receiver 116 corresponding to an activation adjustment 382. The control engine 308 may include an adjustment engine 240 configured to cause the one or more adjustments 382 disclosed herein. In various embodiments, the adjustment engine 240 may correspond to the adjustment engine 240-1 and/or adjustment module 240-2. In some embodiments, the adjustment engine 240 may analyze input monitored by the monitoring engine 226, determinations of the matching engine 238, and/or information stored in one or more repositories 225 to make control adjustment 382 determinations. Based at least in part on one or more control adjustment 382 determinations, the adjustment engine 240 may cause activation of one or more control adjustment 382 actions. For example, responsive to the one or more detected audio cues, the adjustment engine 240 may cause the content receiver 116 to perform the at least one operation.

In various embodiments, the matching engine 238 may generate, develop, and/or otherwise use user specifications 357, categories 312, rules 358, and/or sensor data 359 for individuals sensed based at least in part on adjustment input 302. The matching engine 238 may, for example, correlate items of sensed identification data, device operation data, location data, temporal data, contextual data, and/or the like. The matching engine 238 may compile any one or combination of such data to create, based at least in part on machine-learning, pattern data that may include pattern particulars to facilitate detection, recognition, and differentiation of patterns for individuals and other aspects of the premises based at least in part on items of sensed identification data, device operation data, location data, temporal data, contextual data, and/or the like. The matching engine 238 may include a reasoning module to make logical inferences from a set of the detected and differentiated data to infer one or more patterns of sensed identification data, device operation data, location data, temporal data, contextual data, and/or the like for individuals and aspects of the premises sensed. For instance, the pattern data may include information about any one or combination of identification histories, device operation histories, location histories, temporal histories, and/or the like, any set of which may be used to derive one or more of such patterns. A pattern-based reasoner could be employed to use various statistical techniques in analyzing the data in order to make inferences based on the analysis of the different types of adjustment data 302, both current and historical. A transitive reasoner may be employed to infer relationships from a set of relationships related to different types of adjustment data 302.

The monitoring engine 236 and/or the matching engine 238 may employ an ongoing learning mode to confirm, correct, and/or refine determinations made for the user specifications 357, categories 312, rules 358, and/or sensor data 359. For example, having come to one or more conclusions about endpoints and/or conditions sensed, the control engine 308 may confirm and/or correct the determinations with feedback loop features that may include receiving, processing, and learning from viewer corrections, whether submitted via audio commands, audio-detected comments, and/or other user input such as manual control of the content receiver 116, that the control engine 308 may correlate to one or more conclusions (e.g., conclusions corresponding to virtual assistance, content receiver controls, content access, and/or other types of control adjustments 382). The control engine 308 may correlate the feedback to the one or more conclusions based at least in part on temporal proximity of the feedback and the conclusions, audio-detected content of the feedback that matches the one or more conclusions, identifying user input that overrides the one or more conclusions, and/or the like. Certain embodiments may provide one or more devices 116 with feedback options to facilitate the ongoing learning mode. User-selectable options via a device interface provided with notifications (e.g., push notifications to device 116 and/or the like) could be provided to allow user confirmation or correction of conclusions and/or control adjustments 382 corresponding to such conclusions. The feedback could be used for training the system to heuristically adapt conclusions and the corresponding control adjustments 382, specifications, correlations, attributes, triggers, patterns, and/or the like.

In some embodiments, the matching engine 238 may be configured to match information for individuals and aspects on the premises captured via the monitoring engine 236 to one or more categories 312 from a set of categories 312, corresponding specifications 357, and corresponding control adjustments 382. For example, the matching engine 238 may receive sensor data 302 corresponding to one or more individuals or aspects of the proximity, identify attributes of the one or more individuals or aspects of the proximity based at least in part on the sensor data 302, match the one or more individuals or aspects of the proximity to one or more categories 312 from a category information repository 312, and identify characteristics of the individuals or aspects of the proximity. Any suitable category 312 may be employed to facilitate control adjustment 382 features in accordance various embodiments. The matching engine 238 may access a set of one or more rules specified by an operations protocol. The operations protocol may correspond to a particular set of one or more rules 358, categories 312, and/or viewer profiles 357 with which the subsystem 300 may be configured by default or which the subsystem 300 may pursuant to the ongoing learning algorithms and features disclosed herein in conjunction with user-explicit specifications of preferences and customizations of the operations of the subsystem 300. In some embodiments, the particular set of one or more rules 358, categories 312, and/or viewer profiles 357 may correspond to one or a combination of objects, files, executable code segments, and/or the like which may be linked with pointers and/or other references a decision tree data structure. Accordingly, various embodiments of the operations protocols may employ a protocol order, such as a decision tree, checklist, workflow, and/or the like. The set of one or more rules may include criteria for mapping a recognition of voice data to one or more operations of a content receiver 116. The sensor-based data may correspond to recognition of voice data of one or more particular individuals.

Some embodiments may allow for matching detected individuals with other individual types (e.g., using any suitable individual trait qualifications for correlation). For example, the matching engine 238 may link a particular individual to reference audio data 359 associated with particular individual or individual types to identify a known individual or a new individual or individual type. If it is determined that one or more of the individual audio characteristics do not match individual audio characteristics associated with an already learned viewer, it may be determined whether one or more of the characteristics match one or more viewer categories 312 based at least in part on comparison with audio characteristics the one or more viewer categories 312. If characteristics satisfy a match threshold, the individual can be determined to match with the category 312. Then, the individual can be associated with the category 312.

In some embodiments, the rules 358 stored in the one or more storage repositories 335 may include criteria for matching a set of audio characteristics of individuals or aspects of the premises to a set of one or more categories 312 and/or reference audio data 359. In some embodiments, the one or more storage repositories 335 may correspond to storage medium 225. In some embodiments, the rules 358 may include criteria for matching a set of one or more categories 312 to a set of one or more control adjustments 382. In some embodiments, rules 358 may include one or more rules for matching a set of one or more audio characteristics of a detected individual or aspect with a set of one or more control adjustments 382.

Captured audio data may be correlated to reference audio data 359. To facilitate embodiments disclosed herein, the matching engine 238 may perform audio analysis of audio data captured with audio sensor 116 to determine one or more sound baselines for individual viewers and locations on the premises. The control engine 308 may perform audio analysis of audio data captured with audio sensors and/or microphones 190 to determine one or more sound baselines for particular individuals and/or aspects of the premises. The matching engine 238 may learn patterns of sensor-based data metrics corresponding to audio characteristics disclosed herein, such as tonal, pitch, and volume characteristics; keywords and corresponding language used; ambient noise; and/or the like as distinctive markings. The matching engine 238 may include an audio analyzer and handling module to facilitate that detection, which may detect one or more audio characteristics by way of analyzing audio, applying voice recognition, acoustic spectrum analysis, and/or the like. For example, an acoustic analysis may include analyzing and identifying audio captures for acoustic characteristics such as frequencies, intensities, tones, pitches, and/or the like audio metrics over time to determine audio impressions of locations on the premises (which may include sounds from non-human sources, such as devices, animals, environmental conditions, etc.) and humans thereon. The different audio metric types may be bases for various audio metric categories. Ranges of audio metric values for the different audio metric types may be mapped to audio metric categories 312. The matching engine 238 may select values of one or a combination of the acoustic metrics as distinctive markings and may compile the values as an acoustic impression for the purposes of characterizing a capture corresponding to one or more particular individuals and/or aspects of the premises. The acoustic impression may include a spectrum of frequencies in various embodiments. In some cases, the matching engine 238 may correlate the acoustic impression to one or more audio metric categories 312 for similar acoustic impressions. In various embodiments, the correlation may be based at least in part on matching selected values of the acoustic metrics (e.g., distinctive values such as peaks, baselines, averages, etc.) to acoustic metric ranges of values specified for certain audio metric categories 312.

The adjustments 382 may include any operation of the subsystem 300 that facilitates a virtual assistant 382-1 that provides assistance specific to operations of the content receiver 116 and/or content presented and/or otherwise accessible via the content receiver 116. For example, the virtual assistant 382-1 may be specific to entertainment and may provide feedback and confirmation responsive to viewer-provided voice commands. The virtual assistant 382-1 may provide information about shows, events, channels, and/or the like, responsive to recognized viewer commands and/or automatically based at least in part on learning recognized viewer patterns and matching the patterns to data specifying upcoming shows events, channels, etc. In some embodiments, the subsystem 300 may be architected to support bots configured to provide one or more of the virtual assistance features. In various embodiments, the subsystem 300 may include a bot engine separate from the other engines, or one or a combination of the monitoring engine 236, matching engine 238, and/or adjustment engine 240 may include or otherwise correspond to a bot engine. The bot engine may be configured to one or a combination of build, configure, customize, deploy, interface with, communicate with, and/or otherwise manage bots in accordance with the features disclosed herein. A bot may include a program and/or artificial intelligence corresponding to one or a combination of an agent, a listener, a chatbot, a chatterbot, a talkbot, an interactive agent, artificial conversational entity, and/or the like conforming to any suitable protocols. In various embodiments, the subsystem 300 may use one or more bots may to monitor the input 302 and/or facilitate one or more the features disclosed herein to provide one or more of the adjustments 382.

The adjustments 382 may include any operation that provides content receiver controls 382-2. The content receiver controls 382-2 may include user control of the content receiver 116, such as powering up, powering down, interface option selection, cursor movement, playback controls (e.g., play, pause, fast-forward, rewind, skip, and/or the like), initiating/stopping/setting recordings of content, navigating an EPG, and/or the like. In so doing, the subsystem 300 may provide for voice-activated functionalities of a remote control device, without requiring a remote control device. Such content receiver control operations, as well as other types of adjustments 382 disclosed herein, may be caused by the subsystem 300 in response to the subsystem 300 providing for smart command recognition functionalities. The smart command recognition functionalities may include the subsystem 300 recognizing one or more audio cues (e.g., "Hey Hopper, turn on," ". . . go to channel 142," ". . . channel up," ". . . record this show," ". . . open the program guide," etc.). Some embodiments may further provide for the subsystem 300 recognizing commands without the need for an initializing audio cue such as "Hey Hopper," with the subsystem 300 recognizing and responding to audio commands such as, "Go to channel 144," "Go to the MMA fight," "What channel is the MMA fight on," and/or the like. In some embodiments, such initializing audio cues may never be needed by the subsystem 300 so that the subsystem 300 simply recognizes the audio commands. However, in some embodiments, the subsystem 300 may be triggered by an initializing audio cue for a first command, and then may not need subsequent initializing cues for certain time period (e.g., five minutes, one hour, three hours, etc.) and/or for a particular viewing session (e.g., until the content receiver 116 is powered down, hibernated, etc.).

In addition or in alternative, the subsystem 300 may provide for control with audio commands for the initial viewer to use the initializing audio cue or for a viewer recognized as a controlling/master viewer as disclosed further herein. Further, the subsystem 300 may filter out conflicting voice command interference where the user that initiates the command cue (e.g., "Hey Hopper") is recognized such that the subsystem 300 hones in on that user's voice and ignores other voices at least until the command is received. Accordingly, the subsystem 300 may track the cueing voice and filters out other voices and noises at least until the command is given with the cueing voice. However, such voice tracking and interference elimination may be governed by the controlling viewer hierarchy disclosed further herein. Thus, the subsystem 300 may recognize that a conflicting voice cue and/or command is from a controlling viewer that outranks the initial viewer to use the initializing audio cue and may consequently respond to the conflicting voice cue and/or command, instead of ignoring it.

Responsive to such audio commands, the virtual assistant 382-1 may provide information about shows, events, channels, and/or the like. For example, the subsystem 300 may pull content specifications matching the audio command (and/or a learned pattern for the viewer) and/or the corresponding content from its own data storage (e.g., EPG data storage, on-demand content data storage, and/or the like) and/or from data sources (e.g., one or more service provider systems 102, 103 and/or content sources 112). For example, the subsystem 300 may search the online data storage and/or data sources with one or more queries to identify content specifications and may consequently communicate information derived from the searching to a viewer audially and/or via graphical notifications on the display of the computing device 116 or coupled to the computing device 116.

The adjustments 382 may include providing content access 382-3 responsive to viewer-provided voice commands, for example, by ordering particular shows, events, channels, etc. responsive to viewer-provided voice commands. In some embodiments, the virtual assistant 382-1 may facilitate the content access 382-3 by ordering particular content responsive to viewer-provided voice commands. For example, the subsystem 300 may recognize audio commands such as, "Order the MMA event," "Install the Moby channel," and/or the like. The subsystem 300 may pull content specifications matching the audio command and the corresponding content from its own data storage (e.g., EPG data storage, on-demand content data storage, and/or the like) and/or from data sources (e.g., one or more service provider systems 102, 103 and/or content sources 112). For example, the subsystem 300 may search the online data storage and/or data sources with one or more queries to identify content specifications and may consequently communicate with at least one of the service provider systems 102, 103 and/or content sources 112 to obtain access to the corresponding content. Access to the corresponding content may be accordingly provided to the computing device 116, for example, by installing the requested channel on the computing device 116, configuring on the computing device 116 to access the requested content, configuring the computing device 116 with access credentials for the requested content, etc. In so doing, the subsystem 300 may utilize and store user information in the one or more information repositories 326 to facilitate the content access. In various embodiments, the user information stored in the one or more information repositories 326 may include any one or combination of user account information, contact information (such as linked email account information, telephone information, etc.), notification preferences (such as whether the user has accepted email notifications, push notifications, text message notifications, etc. as means of relaying notifications), user account information with one or more service provider systems 102, 103 and/or content sources 112, content source information, and/or the like.

The adjustments 382 may include providing notifications 382-4 automatically as a function of viewer voice recognition and learned patterns of recognized viewers. Accordingly, the notifications 382-4 may be based at least in part on learning recognized viewer patterns and matching the patterns to data specifying upcoming shows events, channels, etc. The subsystem 300 may voice-recognize who is watching and/or in the room, and may consequently send notifications regarding events/content that is available and learned to be of interest to those recognized. For example, the virtual assistant 382-1 may set and/or send reminders for identified unique viewers (e.g., voice-recognized and differentiated viewers) to watch particular shows at particular times, which reminders may be set responsive to viewer-provided voice commands and/or may be set automatically by the subsystem 300 based at least in part on determinations of one or more patterns of unique viewer-specific interest learned by the subsystem 300 from collected data regarding identified viewer content access interactions, content viewed by voice-recognized viewers, content recorded by voice-recognized viewers, content ordered by voice-recognized viewers, viewer-specified favorites, viewer-specified preferences, and/or the like over a period of time. Such learned viewer-specific patterns may be biased by the subsystem 300 according to recency and/or frequency of such viewer actions mapped to particular types of content. Additionally or alternatively, the subsystem 300 may weight certain actions of the voice-recognized viewer more heavily (e.g., content ordered/purchased may be weighted more heavily than free content, content which the viewer has spent more time viewing may be weighted more heavily than other content that the viewer has spent less time viewing, and/or the like). The subsystem 300 may select one or more highest ranked items automatically identified over a certain time period for the subject of notifications sent to particular viewers.

Such viewer-specific notifications 382-4 may be displayed and/or audially presented in a number of ways. For example, when the display device is activated and content is being presented, the subsystem 300 may cause one or more viewer-specific notifications 382-4 to be presented with the display device and/or one or more speakers of the computing device 116 or communicatively couple thereto. Such viewer-specific notifications 382-4 may take the form of sliding and swipable overlays, other overlays, frames, pop-ups, widows, audio messages, and/or the like during while the other content is being presented. With some embodiments, such viewer-specific notifications 382-4 may only be presented when the subsystem 300 has recognized the voice of a particular viewer within a certain time period (e.g., five minutes, one hour, three hours, etc.) and/or contemporaneously with a particular viewing session (e.g., from initialization of the content receiver 116 until the content receiver 116 is powered down, hibernated, or switched to a different operation; after the particular viewer has prompted presentation of a particular show, during the particular show; etc.). In addition or in alternative, when the particular viewer to which the notification 382-4 is to be directed is not recognized as being present when the display device is activated, the subsystem 300 may cause one or more viewer-specific notifications 382-4 to be transmitted to a mobile device 116 and/or account associated with a particular viewer (e.g., email, text message, app-specific message, and/or the like).

In any case, whether responsive to one or more of such notifications 382-4 or not, a user may operate the content receiver controls 382-2 via voice commands to access content, record shows, etc. Accordingly, the subsystem 300 may provide for a voice-activated user interface that allows a viewer to communicate with the content receiver 116 directly and does not require a remote control device, obviating many of the hassles and inconveniences associated with remote control devices. By providing the solution of a hands-free environment, disclosed embodiments may eliminate or mitigate the complications of a hands-required environment. Yet, the subsystem 300 may still provide for a voice-activated user interface that operates in conjunction with a remote control device. In such situations, the viewer may have the options to utilize voice-activated controls and/or remote control device controls at any suitable time.

The adjustments 382 may further remote control device activation 281-5. Remote control device activation 281-5 may include transmitting wireless signals to a remote control device to cause activation of the remote control device. For example, the activation 281-5 of the remote control device may include activating one or more sound-producing components of the remote control device (e.g., a speaker of the remote control device) to make one or more sounds in any suitable manner. The activation 281-5 of the remote control device may further include activating one or more vibration-producing components of the remote control device (e.g., a vibration controller, motor coupled with weight, etc.) to initiate vibrating of the remote control device in any suitable manner. The activation 281-5 of the remote control device may further include activating or more lighting components of the remote control device (e.g., an LED light) to light up the remote control device in any suitable manner. Such activation operations 281-5 of the remote control device may be caused by the subsystem 300 in response to the subsystem 300 recognizing one or more audio cues (e.g., "Hey Hopper, find my remote," or simple user intent recognition by recognizing viewer words such as recognizing someone saying, "Where's the remote?"). Some embodiments of the subsystem 300 may further provide for remote control device location features that are based at least in part on one or a combination of the foregoing activations 281-5 of the remote control device. For example, one or a combination of the sensors 190 may be used to capture the audio and/or light phenomena resulting from one or a combination of such activations 281-5. The sensor-based data captured may be processed by the subsystem 300 to identify directionality of the phenomena (e.g., identifying a direction from which the sounds of the remote control device are coming). The directionality of the phenomena may be based at least in part on the subsystem 300 determining varying intensities and directions of greatest intensities of the sounds, vibrations, and/or lights produced by the remote control device. The directionality of the phenomena may be based at least in part on triangulation of multiple sources of the phenomena, which may include the direct source of the sounds of the remote control device, the echo/reflections of the sounds/lights of the remote control device off of other services, the sounds of the vibration mechanism, and/or the lights produced by the remote control device. Having determined the directionality of the location of the remote control device, the subsystem 300 may generate a graphical representation (with graphical indicia in any suitable manner that indicates directionality with respect to the content receiver 116 and the remote control device sensed) that indicates/points in the direction of the determined direction of the remote control device, which graphical representation may be caused to be displayed with the display device. Accordingly, the subsystem 300 may provide for voice-activated solutions for the all-too-common situation of losing a remote control device.

The adjustments 382 may include operations that facilitate interfaces 382-6 customized as a function of the viewer-specific patterns and a voice recognition of a viewer. The subsystem 300 may audio-recognize a particular viewer and select the particular viewer as the controlling (master) viewer. Having detected and the particular viewer, the subsystem 300 may select the particular viewer as the controlling viewer based at least in part on a set of rules 358. The set of rules 358 may include identification rules may provide for selecting a particular viewer as the controlling viewer when no other viewer is detected as for a given session and/or within and/or within a particular time window (e.g., 5 minutes, 30 minutes, and/or the like). For example, the rules 358 may provide for the user who initiates a viewing session to be deemed the controlling viewer as a default, absent detection of any other viewer within temporal proximity. The rules 358 may include arbitration rules that govern when two or more individuals are detected in physical proximity to the computing device 116 and are detected within temporal proximity of one another. The arbitration rules may provide for selecting one of the individuals as a controlling viewer. With one of the viewers designated as a controlling viewer, the subsystem 300 may only allow the controlling user to control the computing device 116 via voice-recognized commands. The subsystem 300 may not allow other viewers to overwrite the commands (e.g., any of the user controls, such as which content to play, volume settings, etc.) of the controlling viewer. The controlling user features may be a function of who is identified as being in the room at a given time. For example, the subsystem 300 may employ a hierarchy of access-right indicators corresponding to viewers to determine the controlling user. In some embodiments, the subsystem 300 may infer the hierarchy when a hierarchy is not otherwise specified by a user through user interface options provided via the computing device 116. A viewer access-right indicator hierarchy may, for example, specify that one or more particular viewers may correspond to a highest viewer ranking (e.g., which may correspond to a parent in a particular household, the account owner, etc.), that one or more different particular viewers may correspond to a lower viewer ranking (e.g., which may correspond to an older member in a particular household), that one or more different particular viewers may correspond to an even lower viewer ranking (e.g., which may correspond to a teenage member in a particular household), and so forth. Accordingly, in some instances, a viewer access-right indicator hierarchy may rank viewers according to ages, age ranges, and/or age categories specified for the viewers. Absent an explicit user specification of the hierarchy, the hierarchy may be inferred based at least in part on matching voice characteristics to reference audio impressions that may be mapped to particular ages. For example, certain audio impressions may include specifications of audio characteristics mapped to different age groups (e.g., toddler, young child, tweens, teenagers, young adults, middle-aged adults, older adults, etc.).

Consequently, the subsystem 300 may use the viewer access-right indicator hierarchy to perform adjustments 382. For example, when multiple children are audio-detected as being in the room, the subsystem 300 may determine which child is the highest ranking viewer according to the viewer hierarchy (e.g., the older child) and select that child as the controlling viewer, granting the child controlling viewer control rights. Still, the controlling viewer control rights may be limited by parental control specifications governing the audio-detected viewer(s), as disclosed herein. Thus, continuing the example, the controlling viewer control rights granted to the child may still be limited by parental control specifications such that, when the child attempts to access content prohibited to the child and/or others present (e.g., there's a parental control mismatch when the child attempts to access mature audience content), the subsystem 300 may prohibit the access and log and/or cause notification regarding the attempt as disclosed herein.

The customized interfaces 382-6 customized as a function of the viewer-specific patterns and a voice recognition of a viewer may utilize the system-determined controlling viewer to customize initialization operations of the computing device 116. For example, when the device 116 is initialized (e.g., powered on, awakened, etc.), the initial interface presented may be customized to the controlling viewer. This may include, for example, automatically tuning to or otherwise accessing a particular station, channel, home screen, favorites list, and/or suite of options that is determined by the subsystem 300 to match the viewer-specific pattern of the viewer and temporal parameters (e.g., a current time and day). Such an adjustment 382 may be a default adjustment in absence of other adjustments 382. For example, an overriding adjustment 382 may include automatically adjusting to a point in content (e.g., playback of a show) to pick up where the viewer last stopped viewing the content and powered down, hibernated, closed, or otherwise left off viewing with the computing device 116. In some embodiments, this may include playing a recording of the content that the subsystem 300 automatically initiated when the viewer last stopped viewing the content, thus providing for automatic discontinuous playback features that are function of a particular viewer.

In some instances, the computing device 116 may be initialized with an audio command, and the controlling viewer may be determined based at least in part on voice recognition of the audio command. In some instances, the computing device 116 may be initialized manually (e.g., via a remote control device, pushbuttons or interface elements), and the controlling viewer may be determined based at least in part on voice recognition of voice data captured. In various instances, the controlling viewer may be determined based at least in part on voice recognition of voice data captured before and/or after the initialization of the computing device 116. Further, the customized interfaces 382-6 may be presented at other times after the device 116 is initialized, responsive to detection of a controlling viewer. For example, a first customized interface 382-6 may be presented for the first audio-recognized controlling viewer at initialization, and, subsequently, a second customized interface 382-6 may be presented for a second audio-recognized controlling viewer when the second viewer provides an audio command and is determined by the subsystem 302 to outrank the first viewer according to the viewer hierarchy and therefore be deemed the current controlling viewer. Accordingly, the subsystem 300 may respond to the audio command of the second viewer as well as providing the second customized interface 382-6, which may include, for example, ordering and formatting the interface according to inferred viewer preferences, automatically retrieving user-specific favorite content (inferred and/or explicitly specified favorites), and biasing operations toward the favorite content. The biasing operations toward the favorite content may include searching for and retrieving content matching system-detected criteria of favorite content according to viewer-specific patterns, and notifying the viewer of available content matching the criteria and/or otherwise surfacing such content with indications of availability and options to view the content. This may include reordering, reformatting, and/or computerized selection of interface options to more prominently display such indications over, above and/or read in place of other content options in electronic programming guide, home screen, a list of results, a list of options for browsing, and/or the like.

The viewer-specific customizations of the customized interfaces 382-6 may include viewer-specific adjustments of audio output automatically caused by the subsystem 300 responsive to voice recognition of a controlling viewer. For example, the subsystem 300 may detect a volume level of the voice of the controlling viewer and adjust the volume level of audio output based at least in part on the detected volume level of the voice. The subsystem 300 may employ a directly proportional relationship between the detected volume level of the voice and the adjusted volume level of audio output. As with other features automatically effected herein, the subsystem 300 may employ an ongoing learning process that processes feedback consequent to the adjusted audio output. When an adjustment is corrected by the controlling either explicitly (e.g., an audio command that rejects the automatic volume adjustment) or implicitly (e.g., user input, audio or manual, that corrects the automatic volume adjustment within temporal proximity, say, 60 seconds, 5 minutes, etc., of the volume adjustment having been made), the matching engine 338 may adapt to the feedback. The adaptation may include determining a steady-state acceptable volume level (e.g., after the controlling viewer makes one or more volume level readjustments within temporal proximity to the automatic adjustment) and storing the volume setting in the viewer profile 357. Additionally or alternatively, the adaptation may include adjusting a proportional relationship value of the viewer's voice volume level to the adjusted volume level, which the subsystem 300 may use for subsequent automatic volume adjustments. Accordingly, the subsystem 300 may learn acceptable audio output settings via subsequent adjustments and adapt the viewer's profile 357 and automatic volume adjustments based at least in part on the learning.

Further, the subsystem 300 may learn patterns of audio control of particular controlling viewers. The matching engine 238 may learn audio control patterns that the particular controlling viewer demonstrates in multi-viewer situations. For example, when one or more particular viewers are audio-detected as being in the room, the matching engine 238 may learn user-initiated volume control adjustments. This could capture scenarios where the controlling viewer typically adjusts the volume when one or more other particular viewers are in the room, enter the room, or are about to enter the room. In one scenario, a particular viewer who enters the room may not like the volume being quite so loud, and so the controlling viewer may decrease the volume when the particular viewer enters the room. In another scenario, the volume may be decreased when conversations ensue between viewers in the room. Likewise, the volume may be increased when such conversations pause or otherwise terminate. In yet another scenario, the controlling viewer may increase the volume when there are background conversations or other background noise. The matching engine 238 may learn patterns of such adjustments for particular controlling viewers. The matching engine 238 may subsequently audio-detect multi-viewer situations, match the identified multi-viewer situations to particular patterns of the controlling viewer, and automatically adjusts audio output according to the matched patterns of the controlling viewer.

Similarly, the matching engine 238 may learn audio control patterns that the particular controlling viewer demonstrates in solo viewing situations. The patterns may be a function of the type of content that the controlling viewer views. For example, the particular controlling viewer may have a pattern of a certain volume adjustment being made for action shows, a different volume adjustment being made for dramas, etc. Additionally or alternatively, the patterns may be a function of the time of day when the controller and viewer is viewing the content. For example, the particular controlling viewer may have a pattern of lowering the volume for viewing after 9 PM, raising the volume for viewing between 5 PM and 9 PM, etc. The matching engine 238 may learn patterns of such adjustments for particular controlling viewers, and may subsequently recognize such solo viewing situations, match the type of content viewed and/or time of viewing to particular patterns of the controlling viewer, and may automatically adjust audio output according to the matched patterns of the controlling viewer.

The adjustments 382 may include providing content control 382-7 operations. The content control 382-7 may facilitate parental control 382-7 features. The subsystem 300 may audio-recognize audio commands creating and/or modifying parental controls 382-7 and may consequently update profiles and rules for specific users so that the computing device 116 operates in accordance with the parental controls 382-7. The subsystem 300 may audio-recognize audio commands from a controlling viewer that may apply to a lower-ranked viewer.

Such commands may include, "Hey, Hopper, disable mature audience shows for the previous user," "Hey, Hopper, prevent Jimmy from watching HBO and PPV," and/or the like. Thus, in some instances, the one or more viewer profiles and associated rules and voice impressions may be mapped to a viewer name. Accordingly, the subsystem 300 may interpret the command, identify parameters corresponding to the command (e.g., content criteria that identifies specific content, content types, and/or content attributes, rules for the adjustment 382, and/or the like), map the parameters to the one or more viewers (e.g., the viewer profile identified as Jimmy), modify the one or more profiles 357 and rules 358 for the one or more viewers accordingly.

However, in other instances, one or more viewer profiles may not be identified with a viewer name, and/or the controlling viewer may not know which viewer previously attempted to access particular content. Solving such problems, the subsystem 300 may track, profile, and store a chronicle of voice prints, commands, content accesses, and/or access attempts of users for any suitable period of time. Accordingly, the subsystem 300 may be able to identify a previous viewer (e.g., the immediately prior viewer, two viewers ago, etc.), even when there is not a name associated with the profile of the previous user. The subsystem 300 may allow for audio commands to assign viewer name to particular profiles (e.g., call the previous viewer "Jimmy").

Likewise, the subsystem 300 may be configured to identify viewers according to time periods of use and/or content viewed. Thus, content control commands from a controlling viewer may include, "Hey, Hopper, stop showing MA shows to the user who was watching TV last night," or "Hey, Hopper, disable violent content for the users who watched 'Game of Horrors' last Friday," and/or the like. The subsystem 300 may interpret the command, identify parameters corresponding to the command, map the parameters to the one or more viewers, modify the one or more profiles 357 and rules 358 for the one or more viewers accordingly. Further, the subsystem 300 may infer other rules from specific commands. For example, when the controlling viewer may issue a parental control feature that specifies disabling a particular type of content (e.g., MA rated content, content with violence and/or another type of possibly objectionable content), the subsystem 300 may infer other rules accordingly and disable similar content. Thus, if the controlling viewer specifies prohibiting MA content, the subsystem may likewise disable rated R content and/or the like. As another example, when the controlling viewer may issue a parental control feature that is specified to apply to one particular user, the subsystem 300 may infer that the same control should apply to all other viewers that are younger than the one particular, specified viewer. This may correspond to the subsystem 300 inferring that the same control applies to all others that are ranked the same and lower in the viewer hierarchy than the one particular, specified viewer. In various embodiments, the subsystem 300 may or may not issue virtual assistant inquiries to confirm to inferred rules before applying them.

Thereafter, the subsystem 300 may use the updated one or more profiles 357 and rules 358 for the one or more viewers to enforce the content controls 382-7 when the subsystem 300 detects at least one of the one or more viewers in proximity to the computing device 116. The enforcement may include a lock functionality that prohibits access to content that is prohibited by the one or more profiles 357 and rules 358 for the at least one of the one or more viewers.

The content may be prohibited from being presented, with any suitable notification presented on-screen in place of the prohibited content. In some embodiments, the subsystem 300 may allow for one or more audio commands of the one or more viewers to initiate one or more requests for authorization being sent to an account and/or the computing device 116 of the controlling viewer. Such requests may include email notifications, push notifications, text message notifications, and/or the like in accordance with the notification preferences of the controlling viewer. Responsive to such requests, the controlling viewer may select one or more interface elements of controlling viewer's computing device 116 in order to override the prohibition to allow access to the content or reject the request to maintain the prohibition.

Additionally or alternatively, the enforcement of the content controls 382-7 may include creating and causing transmission of viewer-specific notifications 382-4 when an unauthorized viewer attempts to access unauthorized content that is prohibited according to the viewer's viewer profile 357 and rules 358 associated therewith. The viewer-specific notifications 382-4 may indicate the unauthorized viewer, the attempted access, a time of access, and/or the like information regarding the one or more attempts, with the notifications 382-4 being transmitted to a mobile device 116 and/or account associated with a controlling viewer (e.g., email, text message, app-specific message, push notifications, pop-ups notification to another computing device 116, and/or the like). In various embodiments, such notifications 382-4 may be issued in addition to or in alternative to preventing the unauthorized access (e.g., via a lock screen and/or the like). In some embodiments, the subsystem 300 may recognize multitier situations where the current controlling viewer in the room may be allowed access to certain types of content, but one or more other detected viewers (e.g., younger siblings) may not be allowed access to the same content. When such situations are detected, the subsystem 300 may in some embodiments prevent access to the content, while sending notifications 382-4 to one or more controlling viewers (e.g., one or more top-ranked viewers according to the viewer hierarchy, which may correspond to one or more parents). In some embodiments, when such situations are detected, the subsystem 300 may not prevent access to the content, but may still send notifications 382-4 to one or more controlling viewers (e.g., one or more top-ranked viewers).

Additionally or alternatively, the enforcement of the content controls 382-7 may include creating and causing transmission of log data corresponding to tracking of content accesses, access attempts, issued audio commands, attempted commands, and/or the like for particular audio-recognize viewers. The subsystem 300 may track accesses, access attempts, issued audio commands, attempted commands, and/or the like of various viewers (e.g., lower-ranked viewers and/or others according to default configuration settings or other user-explicit configuration settings). The subsystem 300 may store the log data and associated viewer profiles 357 and may surface such log data via one or more computing devices 116 and/or notifications 382-4, upon audio commands of one or more controlling viewers. The log data may be surfaced in any suitable form, with any suitable graphical representation of the log data.

The adjustments 382 may include providing adapted content 382-8. The voice interaction subsystem 300 may be further configured to receive adaptable content items 176 and particularized content items 177. The monitoring engine 236 may be configured to aggregate adaptable content items 176, particularized content items 177, and/or other content 202 in order to facilitate content splicing features disclosed herein. The matching engine 238, which, in various embodiments, may be configured to analyze, classify, categorize, characterize, tag, and/or annotate adaptable content items 176, particularized content items 177, and/or other content 202. In some embodiments, the adjustment engine 240 may include a multiplexer. In various embodiments, the multiplexer may create a digital stream of data packets containing the video, audio, and, in some embodiments, the metadata to output the other content 202, adaptable content items 176, and/or the composites 180 created with selected adaptable content items 176.

In some embodiments, the adaptable content items 176 may correspond to commercials to be presented during commercial breaks of other content 202. In various embodiments, the content items 176 may include audiovisual content broadcast and/or otherwise transmitted by the content provider system 102-1. In some embodiments, adaptable content items 176 may be pushed by the content provider system 102-1 to the subsystem 300. In addition or in alternative, adaptable content items 176 may be pulled by the subsystem 300 (e.g., by the monitoring engine 236) from the content provider system 102-1. The particularized content items 177 may correspond to content that is particularized to certain languages, accents, dialects, and/or keywords and that is sourced by one or more of the service provider systems 103-1. In various embodiments, the service provider systems 103-1 may correspond to one or more sources of data, products, and/or services corresponding to the adaptable content items 176, and particularized content items 177 may correspond to the specific data and/or services sourced by a specific service provider system 103-1 for one or more specific products and/or services. As disclosed above, the adaptable content items 176 and/or the content items 177 may correspond to any one or combination of raw data, unstructured data, structured data, information, and/or content which may include media content, text, documents, files, instructions, code, executable files, images, video, audio, audio video, and/or any other suitable content suitable for embodiments of the present disclosure.

In various embodiments, sets of one or more adaptable content items 176 and/or sets of one or more content items 177 may be transmitted to the subsystem 300 in batches. For example, sets of one or more adaptable content items 176 and/or sets of one or more content items 177 may be transmitted to the subsystem 300 on a periodic or otherwise scheduled basis. The subsystem 300 may store the adaptable content items 176 locally and, subsequently select one or more of the adaptable content items 176 when needed for presentation during an upcoming break in the programming content 202 and/or when needed for presentation during the programming content 202. In some embodiments, sets of one or more adaptable content items 176 and/or sets of one or more content items 177 may be selected (e.g., the service provider system 102-1) as tailored for particular languages, accents, dialects, and/or keywords.

Sets of one or more content items 177 may be pulled from or pushed by one or more service provider systems 103-1, in various embodiments using one or more of the various methods disclosed, to the subsystem 300 directly or indirectly (e.g., by way of the content provider system 102-1, which may then transmit the content items 177 to the subsystem 300) for particular time periods, with assignments for designated channels, shows, movies, and/or television programs. For example, in conjunction with the selection of sets of one or more adaptable content items 176, sets of one or more content items 177 that match the one or more adaptable content items 176 may be pulled from one or more service provider systems 103-1.

To facilitate audio correlation features disclosed herein, the voice interaction subsystem 300 (e.g., by way of the matching engine 238) may be configured to detect one or more audio characteristics (e.g., particular languages, accents, dialects, and/or keywords) from sensor input 304, in content items 176 and/or other content 202. By way of example, the matching engine 238 may detect one or more audio characteristics from sensor input 304, in content items 176 and/or other content 202 by way of any one or combination of analyzing audio, applying voice recognition, acoustic spectrum analysis, analyzing the audio tracks metadata track, comparison to acoustic profiles for types of content, and/or the like. Some embodiments of the voice interaction subsystem 300 may store acoustic profiles mapped to types of content items 176 and/or programming content 202 and corresponding provider systems 103 in the repository 225. Each acoustic profile may specify one or more selected values of acoustic metrics as distinctive markings and/or acoustic categories 214 (e.g., languages, accents, dialects, and/or keywords and/or the like) as characteristics of the types of content items 176 and/or other content 202 and corresponding provider systems 103.

As another example of audio-detection and matching features disclosed herein, the subsystem 300 may recognize one or more keywords and/or expressions from sensor input 304, in content items 176 and/or other content 202 for the purposes of characterizing the samples and providing adjustments 382. The matching engine 238 may compile the keywords and/or expressions of samples and retain the keywords and/or expressions. In various embodiments, the correlation to one or more categories 212 may be based at least in part on matching selected keywords and/or expressions to identical and/or similar keywords and/or expressions specified for certain categories 212. The audio categories 212 may include categorizations of concept, keyword, expression, and/or the like mapped to particular rules 358 and/or adjustments 382. The profiles disclosed herein may be retained in any suitable form, such as a file, an array, a list, etc. Each category 212 may specify one or more selected keywords and/or expressions as distinctive markings and/or characteristics corresponding to particular rules 358 and/or adjustments 382.

The matching engine 238 may perform correlation based at least in part on correlation rules. The correlation rules may include correlation criteria that could include keywords identified by any one or combination of words, word stems, phrase, word groupings, and/or like keyword information. The correlation criteria could include weightings assigned to dialogue specifications. Hence, within each dialogue bucket, a keyword could be assigned a weight according to its significance. More significant keywords could be assigned a greater weight than stop words. Such buckets could be implemented in any suitable manner, including lists, tables, matrices, and/or the like. And within a bucket, characteristics and/or keywords could be organized in a rank order and/or any hierarchical structure according to weight. Some embodiments may have characteristics and/or keywords organized according to decision tree, with contingencies so that only certain combinations of characteristics and/or keywords may be considered. For example, certain characteristics and/or keywords could only have significance if used in conjunction with other characteristics and/or keywords, and/or not in conjunction with others. In some embodiments, the matching engine 238 may employ a scoring system to quantify correlations with a numerical expression, for example, a match score, with higher scores being assigned to higher correlations. Higher scores may be assigned for greater extents of matching. For example, a match of three audio cues or audio categories may be assigned a higher score than a match of only one top audio cue and/or audio category. As another example, an exact match of words, expressions, and/or audio categories may be assigned a higher score than a complimentary match (e.g., where absent an exact match, a word, expression, and/or dialogue category is defined as a complement to another a word, expression, and/or audio category).

Figure 4:
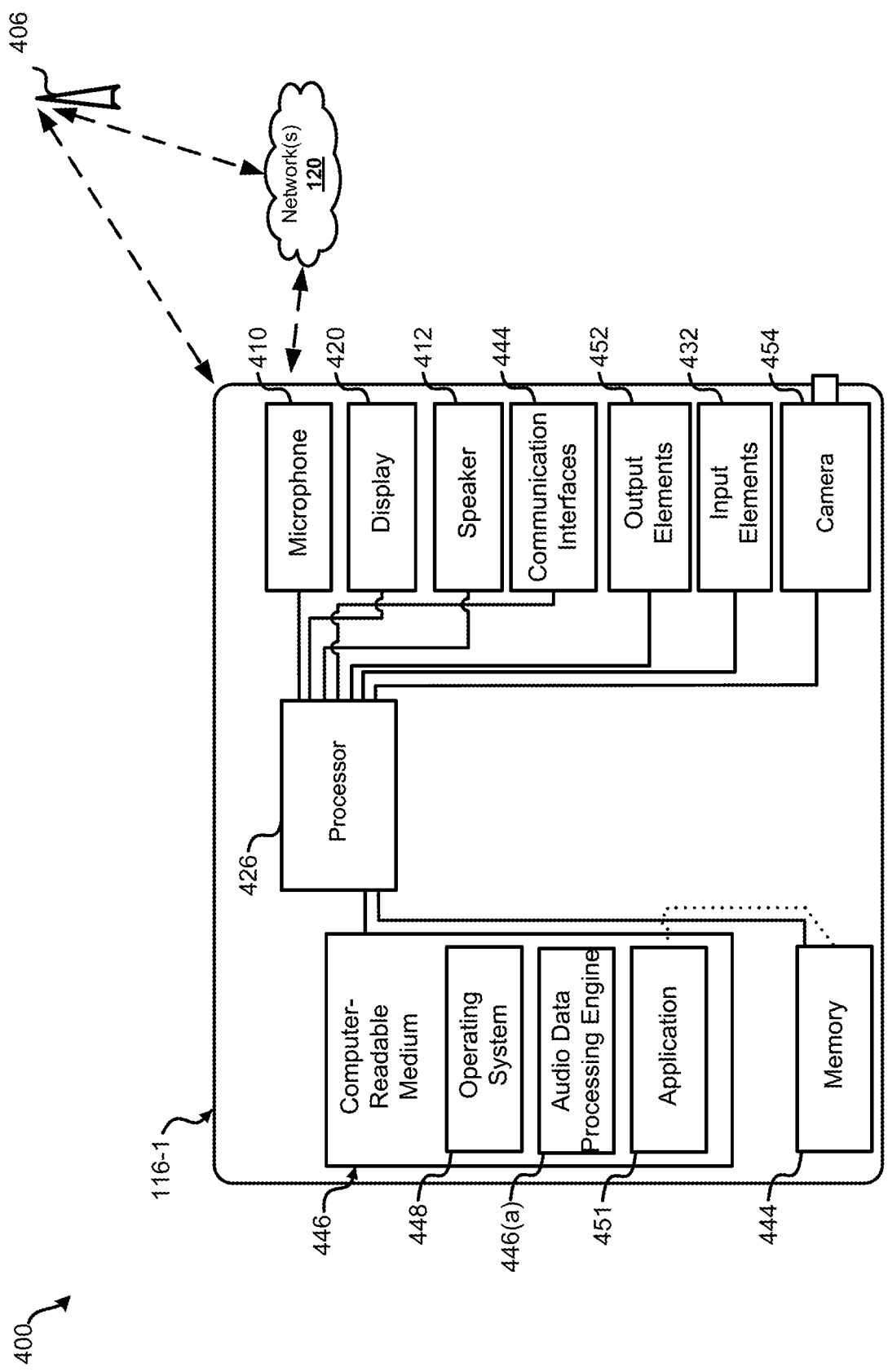
FIG. 4 illustrates a system including one non-limiting example of a computing device configured to make use of, interact with, and/or at least partially include the voice interaction subsystem, in accordance with disclosed embodiments of the present disclosure.

FIG. 4 is a block diagram of a system 400 including one non-limiting example of a computing device 116 configured to make use of, interact with, and/or at least partially include the subsystem 300, in accordance with disclosed embodiments of the present disclosure. The computing device 116 may be a portable device suitable for sending and receiving information to/from the receiver 116e and over a network to/from remote data sources (e.g., service providers 103-1 and online content sources 112) in accordance with embodiments described herein. For example, in various embodiments, the computing device 116 may correspond to one or more of computing devices 116a-, 116b, 116c, 116d.

In some embodiments, the computing device 116 may be provided with an application 451, which may, in some embodiments, correspond to a mobile application configured to run on the computing device 116 to facilitate various embodiments of this disclosure. For example without limitation, the mobile application 451 may transform the computing device 116 into an adaptive content splicing device to facilitate features of various embodiments disclosed herein. In various embodiments, the mobile application 451 may allow the device 116 to be configured to provide one or a combination of the monitoring engine 236-1, the matching/learning engine 238-1, and/or adjustment engine 240-1, which may be provided in conjunction with monitoring module 236-2, the matching/learning module 238-2, and/or adjustment module 240-2 to implement various functionalities of the voice interaction subsystem 300 into the device 116.

In various embodiments, the application 451 can be any suitable computer program that can be installed and run on the computing device 116, and, in some embodiments, the application 451 may not be a mobile app but may be another type of application, set of applications, and/or other executable code configured to facilitate embodiments disclosed herein. The application 451 may be provided in any suitable way. For non-limiting example, the application 451 may be made available from a website, an application store, the service provider 102-1, etc. for download to the computing device 116; alternatively, it may be pre-installed on the computing device 116.

In various embodiments, the computing device 116 configured with the application 451 may provide one or more display screens that may each include one or more user interface elements. A user interface may include any text, image, and/or device that can be displayed on a display screen for providing information to a user and/or for receiving user input. A user interface may include one or more widgets, text, text boxes, text fields, tables, grids, charts, hyperlinks, buttons, lists, combo boxes, checkboxes, radio buttons, and/or the like. As shown in FIG. 4, the computing device 116 includes a display 420 and input elements 432 to allow a user to input information into the computing device 116. By way of example without limitation, the input elements 432 may include one or more of a keypad, a trackball, a touchscreen, a touchpad, a pointing device, a microphone, a voice recognition device, or any other appropriate mechanism for the user to provide input.

The user selection of a user-selectable option corresponding to the application 451 may involve any one or combination of various user inputs. The user selection may be in the form of a keyboard/keypad input, a touch pad input, a track ball input, a mouse input, a voice command, etc. For example, the content item may be selected by the user by pointing and clicking on a content item. As another example, a content item may be selected by an appropriate tap or movement applied to a touch screen or pad of the computing device 116.

The computing device 116 includes a memory 434 communicatively coupled to a processor 436 (e.g., a microprocessor) for processing the functions of the computing device 116. The computing device 116 may include at least one antenna 438 for wireless data transfer to communicate through a cellular network, a wireless provider network, and/or a mobile operator network, such as GSM, for example without limitation, to send and receive Short Message Service (SMS) messages or Unstructured Supplementary Service Data (USSD) messages. The computing device 116 may also include one or more microphones 410 and/or other audio sensors 190 to allow a user to transmit voice communication through the computing device 116, and a speaker 442 to allow the user to hear voice communication. The antenna 438 may include a cellular antenna (e.g., for sending and receiving cellular voice and data communication, such as through a network such as a 3G, 4G, or 5G network). In addition, the computing device 116 may include one or more interfaces in addition to the antenna 438, e.g., a wireless interface coupled to an antenna.

The communications interfaces 444 can provide a near field communication interface (e.g., contactless interface, Bluetooth, optical interface, infrared interface, etc.) and/or wireless communications interfaces capable of communicating through a cellular network, such as GSM, or through Wi-Fi, such as with a wireless local area network (WLAN). Accordingly, the computing device 116 may be capable of transmitting and receiving information wirelessly through both short range, radio frequency (RF), cellular, and Wi-Fi connections. The computing device 116 may access the network 108 through a wireless link to an access point. For example, a computing device 116 may access the network 108 through one or more access points 406. The access points 406 may be of any suitable type or types. For example, an access point 406 may be a cellular base station, an access point for wireless local area network (e.g., a Wi-Fi access point), an access point for wireless personal area network (e.g., a Bluetooth access point), etc. The access point 406 may connect the computing device 116 to the network 108, which may include the Internet, an intranet, a local area network, private communication networks, etc. In some embodiments, the communications interfaces 444 may allow computing device 116 to receive programming content cast from the television receiver. For example, the programming content from the television receiver may be indirectly transmitted via a local network (e.g., via Wi-Fi) or directly transmitted to the computing device via a casting device integrated with the television receiver or coupled to the television receiver (e.g., via a dongle). As another example, the television receiver may cast programming content to the computing device via a wired connection (e.g., via one or more of HDMI, USB, lightning connector, etc.). Some embodiments may provide for simulcasting such that the same programming that is being displayed on the display device is being displayed on the computing device 116 simultaneously or substantially simultaneously.

The computing device 116 can also include at least one computer-readable medium 446 coupled to the processor 436, which stores application programs and other computer code instructions for operating the device, such as an operating system (OS) 448. In some embodiments, the application 451 may be stored in the memory 434 and/or computer-readable media 446. Again, the example of computing device 116 is non-limiting. Other devices, such as those disclosed herein, may be used.

The mobile computing device 436 can additionally include an integrated camera 454, capable of capturing images and/or video, and output elements 452. In certain embodiments, the mobile computing device 436 may include a non-transitory computer-readable storage medium, e.g., memory 434, for storing audio data captured with the one or more microphones 410 and/or other audio sensors 190. In alternative embodiments, the mobile computing device 436 receives audio data from one or more other devices having one or more audio sensors 190 that are not integrated with the mobile computing device 116-1 (e.g., from one or more other devices 116).

In some embodiments, the computer-readable medium 446 can also include an audio data processing engine 446(a). The audio data processing engine 446(a) can perform audio data processing of audio data captured by the one or more microphones 410 and/or other audio sensors 190 to perform audio-recognition-based features in accordance with embodiments disclosed herein. The audio data processing engine 446(a) may analyze the audio data and generate accessible interface elements using the identified and/or analyzed audio data. With some embodiments, the audio data processing engine 446(a) is separate from the application 451. In other embodiments, the application 451 may include the audio data processing engine 446(a). In some embodiments, the computing device 116 provides the captured audio to the receiver 116e, and the receiver 116e performs the audio data processing and analysis. In some embodiments, the computing device 116 provides the captured audio data to the service provider 102-1, and the service provider performs the audio data processing and analysis.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Figure 5:
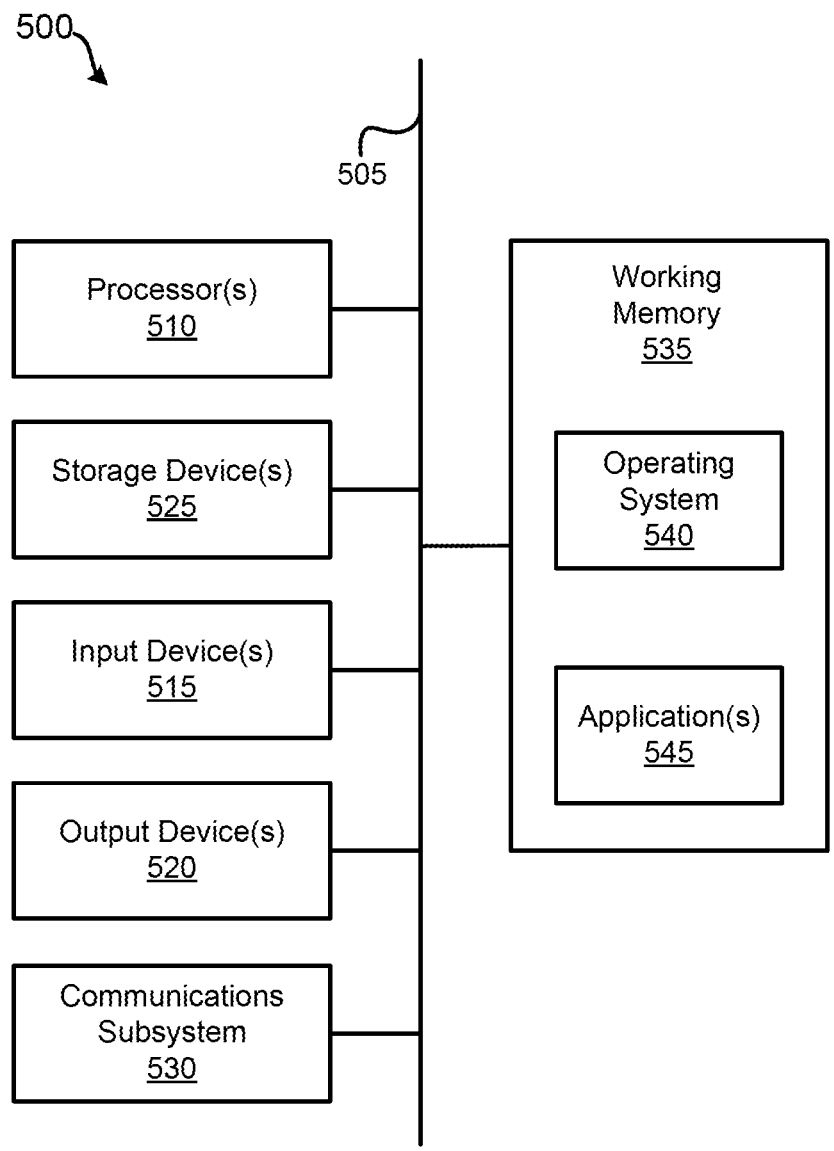
FIG. 5 illustrates a computer system, in accordance with disclosed embodiments of the present disclosure.

A computer system as illustrated in FIG. 5 may be incorporated as part of the previously described computerized devices, such as a television receiver 116e, device(s) 116, and/or content provider system 102-1. FIG. 5 provides a schematic illustration of one embodiment of a computer system 500 that can perform various steps of the methods provided by various embodiments. It should be noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505 (or may otherwise be in communication, as appropriate). The hardware elements may include one or more processors 510, including without limitation one or more general-purpose processors and/or one or more special-purpose processors (such as digital signal processing chips, graphics acceleration processors, video decoders, and/or the like); one or more input devices 515, which can include without limitation a mouse, a keyboard, remote control, and/or the like; and one or more output devices 520, which can include without limitation a display device, a printer, and/or the like.

The computer system 500 may further include (and/or be in communication with) one or more non-transitory storage devices 525, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 500 might also include a communications subsystem 530, which can include without limitation a modem, a network card (wireless or wired), an infrared communication device, a wireless communication device, and/or a chipset (such as a Bluetooth™ device, an 502.11 device, a Wi-Fi device, a WiMAX device, cellular communication device, etc.), and/or the like. The communications subsystem 530 may permit data to be exchanged with a network (such as the network described below, to name one example), other computer systems, and/or any other devices described herein. In many embodiments, the computer system 500 will further comprise a working memory 535, which can include a RAM or ROM device, as described above.

The computer system 500 also can comprise software elements, shown as being currently located within the working memory 535, including an operating system 540, device drivers, executable libraries, and/or other code, such as one or more application programs 545, which may comprise computer programs provided by various embodiments, and/ or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 525 described above. In some cases, the storage medium might be incorporated within a computer system, such as computer system 500. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.), then takes the form of executable code.

As mentioned above, in one aspect, some embodiments may employ a computer system (such as the computer system 500) to perform methods in accordance with various embodiments of the invention. According to a set of embodiments, some or all of the procedures of such methods are performed by the computer system 500 in response to processor 510 executing one or more sequences of one or more instructions (which might be incorporated into the operating system 540 and/or other code, such as an application program 545) contained in the working memory 535. Such instructions may be read into the working memory 535 from another computer-readable medium, such as one or more of the non-transitory storage device(s) 525. Merely by way of example, execution of the sequences of instructions contained in the working memory 535 might cause the processor(s) 510 to perform one or more procedures of the methods described herein.

The terms "machine-readable medium," "computer-readable storage medium" and "computer-readable medium," as used herein in singular or plural form, refer to any medium that participates in providing data that causes a machine to operate in a specific fashion. These mediums may be non-transitory. In an embodiment implemented using the computer system 500, various computer-readable media might be involved in providing instructions/code to processor(s) 510 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 525. Volatile media include, without limitation, dynamic memory, such as the working memory 535.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500.

The communications subsystem 530 (and/or components thereof) generally will receive signals, and the bus 505 then might carry the signals (and/or the data, instructions, etc. carried by the signals) to the working memory 535, from which the processor(s) 510 retrieves and executes the instructions. The instructions received by the working memory 535 may optionally be stored on a non-transitory storage device 525 either before or after execution by the processor(s) 510.

It should further be understood that the components of computer system 500 can be distributed across a network. For example, some processing may be performed in one location using a first processor while other processing may be performed by another processor remote from the first processor. Other components of computer system 500 may be similarly distributed. As such, computer system 500 may be interpreted as a distributed computing system that performs processing in multiple locations. In some instances, computer system 500 may be interpreted as a single computing device, such as a distinct laptop, desktop computer, or the like, depending on the context.

The methods, systems, and devices discussed above are examples. Various configurations may omit, substitute, or add various procedures or components as appropriate.

For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Also, the terms in the claims have their plain, ordinary meaning unless otherwise explicitly and clearly defined by the patentee. The indefinite articles "a" or "an," as used in the claims, are defined herein to mean one or more than one of the element that the particular article introduces; and subsequent use of the definite article "the" is not intended to negate that meaning. Furthermore, the use of ordinal number terms, such as "first," "second," etc., to clarify different elements in the claims is not intended to impart a particular position in a series, or any other sequential character or order, to the elements to which the ordinal number terms have been applied.

What is claimed:

1. A system comprising:
   one or more processing devices; and
   one or more non-transitory, computer-readable storage media storing instructions which, when executed by the one or more processing devices, cause the one or more processing devices to perform operations comprising:
      receiving sensor-based data that is based at least in part on an audio sensor capturing audio phenomena corresponding to one or more individuals in proximity to the audio sensor;
      using the sensor-based data to perform voice recognition and identify a first user;
      detecting a plurality of operations of a content receiver;
      performing a learning process that develops a profile particularized to the first user and a set of rules associated with the profile based at least in part on:
         mapping recognized voice data corresponding to the first user and the plurality of operations of the content receiver based at least in part on at least some of the recognized voice data and at least some of the plurality of operations of the content receiver having temporal proximity; and developing pattern data corresponding to the mapping;
detecting a subsequent instance of the first user in proximity to the audio sensor; and
consequent to the detecting the subsequent instance, causing one or more subsequent adjustments to the content receiver based at least in part on the learning process.

2. The system as recited in claim 1, the operations further comprising:
consequent to the one or more subsequent adjustments:
detecting one or more additional operations of the content receiver and/or additional voice data corresponding to the first user; and
continuing the learning process to confirm, correct, and/or refine determinations made for the profile particularized to the first user and the set of rules associated with the profile based at least in part on the one or more additional operations of the content receiver and/or the additional voice data corresponding to the first user.

3. The system as recited in claim 1, the operations further comprising:
using additional sensor-based data to perform voice recognition and identify one or more additional users, where a plurality of users comprises the first user and the one or more additional users; and
developing a hierarchy of users so that the plurality of users are ranked according to the hierarchy of users.

4. The system as recited in claim 3, the operations further comprising:
detecting an instance of multiple users in proximity to the audio sensor; and
consequent to the detecting the instance of the multiple users, causing one or more additional adjustments to the content receiver based at least in part on the hierarchy of users.

5. The system as recited in claim 1, where the one or more subsequent adjustments to the content receiver comprise:
customizing an interface of the content receiver based at least in part on the set of rules associated with the profile particularized to the first user.

6. The system as recited in claim 5, where the customizing the interface of the content receiver is further based at least in part on a hierarchy of users.

7. The system as recited in claim 1, where the mapping is based at least in part on voice commands of the first user.

8. The system as recited in claim 1, where the content receiver comprises the one or more processing devices and the one or more non-transitory, computer-readable storage media.

9. A method comprising:
receiving sensor-based data that is based at least in part on an audio sensor capturing audio phenomena corresponding to one or more individuals in proximity to the audio sensor;
using the sensor-based data to perform voice recognition and identify a first user;
detecting a plurality of operations of a content receiver;
performing a learning process that develops a profile particularized to the first user and a set of rules associated with the profile based at least in part on:
mapping recognized voice data corresponding to the first user and the plurality of operations of the content receiver based at least in part on at least some of the recognized voice data and at least some of the plurality of operations of the content receiver having temporal proximity; and
developing pattern data corresponding to the mapping;
detecting a subsequent instance of the first user in proximity to the audio sensor; and
consequent to the detecting the subsequent instance, causing one or more subsequent adjustments to the content receiver based at least in part on the learning process.

10. The method as recited in claim 9, further comprising:
consequent to the one or more subsequent adjustments:
detecting one or more additional operations of the content receiver and/or additional voice data corresponding to the first user; and
continuing the learning process to confirm, correct, and/or refine determinations made for the profile particularized to the first user and the set of rules associated with the profile based at least in part on the one or more additional operations of the content receiver and/or the additional voice data corresponding to the first user.

11. The method as recited in claim 9, further comprising:
using additional sensor-based data to perform voice recognition and identify one or more additional users, where a plurality of users comprises the first user and the one or more additional users; and
developing a hierarchy of users so that the plurality of users are ranked according to the hierarchy of users.

12. The method as recited in claim 11, further comprising:
detecting an instance of multiple users in proximity to the audio sensor; and
consequent to the detecting the instance of the multiple users, causing one or more additional adjustments to the content receiver based at least in part on the hierarchy of users.

13. The method as recited in claim 9, where the one or more subsequent adjustments to the content receiver comprise:
customizing an interface of the content receiver based at least in part on the set of rules associated with the profile particularized to the first user.

14. The method as recited in claim 13, where the customizing the interface of the content receiver is further based at least in part on a hierarchy of users.

15. One or more non-transitory, machine-readable media having machine-readable instructions thereon which, when executed by one or more processing devices, cause the one or more processing devices to perform operations comprising:
receiving sensor-based data that is based at least in part on an audio sensor capturing audio phenomena corresponding to one or more individuals in proximity to the audio sensor;
using the sensor-based data to perform voice recognition and identify a first user;
detecting a plurality of operations of a content receiver;
performing a learning process that develops a profile particularized to the first user and a set of rules associated with the profile based at least in part on:
mapping recognized voice data corresponding to the first user and the plurality of operations of the content receiver based at least in part on at least some of the recognized voice data and at least some of the plurality of operations of the content receiver having temporal proximity; and
developing pattern data corresponding to the mapping;

detecting a subsequent instance of the first user in proximity to the audio sensor; and consequent to the detecting the subsequent instance, causing one or more subsequent adjustments to the content receiver based at least in part on the learning process.

16. The one or more non-transitory, machine-readable media as recited in claim 15, the operations further comprising:

consequent to the one or more subsequent adjustments:
detecting one or more additional operations of the content receiver and/or additional voice data corresponding to the first user; and
continuing the learning process to confirm, correct, and/or refine determinations made for the profile particularized to the first user and the set of rules associated with the profile based at least in part on the one or more additional operations of the content receiver and/or the additional voice data corresponding to the first user.

17. The one or more non-transitory, machine-readable media as recited in claim 15, the operations further comprising:

using additional sensor-based data to perform voice recognition and identify one or more additional users, where a plurality of users comprises the first user and the one or more additional users; and developing a hierarchy of users so that the plurality of users are ranked according to the hierarchy of users.

18. The one or more non-transitory, machine-readable media as recited in claim 17, the operations further comprising:

detecting an instance of multiple users in proximity to the audio sensor; and consequent to the detecting the instance of the multiple users, causing one or more additional adjustments to the content receiver based at least in part on the hierarchy of users.

19. The one or more non-transitory, machine-readable media as recited in claim 15, where the one or more subsequent adjustments to the content receiver comprise:

customizing an interface of the content receiver based at least in part on the set of rules associated with the profile particularized to the first user.

* * * * *